US011734919B1

(12) United States Patent
Cazzari et al.

(10) Patent No.: US 11,734,919 B1
(45) Date of Patent: Aug. 22, 2023

(54) FLEXIBLE COMPUTER ARCHITECTURE FOR PERFORMING DIGITAL IMAGE ANALYSIS

(71) Applicant: SAS Institute Inc., Cary, NC (US)

(72) Inventors: Daniele Cazzari, Cary, NC (US); Hardi Desai, Raleigh, NC (US); Allen Joseph Langlois, Apex, NC (US); Jonathan Walker, Raleigh, NC (US); Thomas Tuning, Cary, NC (US); Saurabh Mishra, Cary, NC (US); Varunraj Valsaraj, Cary, NC (US)

(73) Assignee: SAS Institute, Inc., Cary, NC (US)

( * ) Notice: Subject to any disclaimer, the term of this patent is extended or adjusted under 35 U.S.C. 154(b) by 0 days.

(21) Appl. No.: 17/988,463

(22) Filed: Nov. 16, 2022

Related U.S. Application Data

(60) Provisional application No. 63/353,651, filed on Jun. 20, 2022, provisional application No. 63/332,295, filed on Apr. 19, 2022.

(51) Int. Cl.
*G06V 10/94* (2022.01)

(52) U.S. Cl.
CPC .................. *G06V 10/94* (2022.01)

(58) Field of Classification Search
CPC ...................................... G06V 10/94
See application file for complete search history.

(56) References Cited

U.S. PATENT DOCUMENTS

| 6,633,865 B1* | 10/2003 | Liao | H04L 45/7453 |
| 10,356,577 B1* | 7/2019 | Kugler | G08G 1/123 |
| 11,269,808 B1* | 3/2022 | Yuan | G06F 16/164 |
| 2004/0226011 A1* | 11/2004 | Augsburg | G06F 9/3861 |
| | | | 712/E9.046 |

(Continued)

OTHER PUBLICATIONS

Luo X, Feng L, Xun H, Zhang Y, Li Y, Yin L. Rinegan: a scalable image processing architecture for large scale surveillance applications. Frontiers in Neurorobotics. Aug. 23, 2021;15:648101. (Year: 2021).*

(Continued)

*Primary Examiner* — Michelle M Entezari
(74) *Attorney, Agent, or Firm* — Kilpatrick Townsend & Stockton LLP

(57) ABSTRACT

A flexible computer architecture for performing digital image analysis is described herein. In some examples, the computer architecture can include a distributed messaging platform (DMP) for receiving images from cameras and storing the images in a first queue. The computer architecture can also include a first container for receiving the images from the first queue, applying an image analysis model to the images, and transmitting the image analysis result to the DMP for storage in a second queue. Additionally, the computer architecture can include a second container for receiving the image analysis result from the second queue, performing a post-processing operation on the image analysis result, and transmitting the post-processing result to the DMP for storage in a third queue. The computer architecture can further include an output con- (Continued)

tainer for receiving the post-processing result from the third queue and generating an alert notification based on the post-processing result.

30 Claims, 19 Drawing Sheets

(56) References Cited

U.S. PATENT DOCUMENTS

| | | | | |
|---|---|---|---|---|
| 2006/0279628 | A1* | 12/2006 | Fleming | H04N 5/76 |
| | | | | 348/E7.086 |
| 2013/0060834 | A1* | 3/2013 | Paramasivam | H04L 12/66 |
| | | | | 709/202 |
| 2014/0247347 | A1* | 9/2014 | McNeill | G06T 7/0004 |
| | | | | 382/103 |
| 2016/0134693 | A1* | 5/2016 | Li | G06F 16/00 |
| | | | | 709/203 |
| 2019/0020973 | A1* | 1/2019 | Harish | G01C 21/20 |
| 2020/0027210 | A1* | 1/2020 | Haemel | G16H 30/20 |
| 2021/0144517 | A1* | 5/2021 | Guim Bernat | H04L 9/0637 |
| 2021/0279659 | A1* | 9/2021 | Torttila | G06T 7/13 |
| 2022/0006952 | A1* | 1/2022 | Okuike | H04N 23/64 |
| 2022/0122077 | A1* | 4/2022 | Vengadasundaram | |
| | | | | G06F 16/2379 |
| 2022/0417450 | A1* | 12/2022 | Nicholson | H04N 23/611 |

OTHER PUBLICATIONS

Hong, Kirak, et al. "Target container: A target-centric parallel programming abstraction for video-based surveillance." 2011 Fifth ACM/IEEE International Conference on Distributed Smart Cameras. IEEE, 2011. (Year: 2011).*

Okwuibe, Jude, et al. "SDN enhanced resource orchestration of containerized edge applications for industrial IoT." IEEE Access 8 (2020): 229117-229131. (Year: 2020).*

Kim, Yoon-Ki, and Chang-Sung Jeong. "Large scale image processing in real-time environments with Kafka." Proceedings of the 6th AIRCC International Conference on Parallel, Distributed Computing Technologies and Applications (PDCTA). 2017. (Year: 2017).*

* cited by examiner

FLEXIBLE COMPUTER ARCHITECTURE FOR PERFORMING DIGITAL IMAGE ANALYSIS

REFERENCE TO RELATED APPLICATIONS

This claims the benefit of priority under 35 U.S.C. § 119(e) to U.S. Provisional Patent Application No. 63/332,295, filed Apr. 19, 2022, and to U.S. Provisional Patent Application No. 63/353,651, filed Jun. 20, 2022, the entirety of each of which is hereby incorporated by reference herein.

TECHNICAL FIELD

The present disclosure relates generally to performing digital image analysis using a computer system. More specifically, but not by way of limitation, this disclosure relates to a flexible computer architecture for performing digital image analysis.

BACKGROUND

Digital image analysis involves a computer executing software to automatically analyze digital images for the purpose of determining information about them. For example, the software can analyze digital images to classify them into categories, detect whether a certain type of object is present in an image (e.g., detect whether an image shows a cat), recognize an object in an image (e.g., facial or fingerprint recognition), or determine the location of an object in an image. To assist in performing this analysis, the software may include a model. For example, the model may include a machine-learning model (e.g., a neural network and classifier) that may have a relatively complex architecture and that may have been trained on thousands or millions of pieces of training data. Digital image analysis has been applied in a wide range of fields for a variety of applications, including optical character recognition, machine inspection, 3D model building, automotive safety, medical imaging, surveillance, and biometric identification.

SUMMARY

One example of the present disclosure includes a system comprising a plurality of processors and a plurality of memories, the plurality of memories including program code that is executable by the plurality of processors for causing the plurality of processors to perform operations. The operations can include executing a distributed messaging platform configured to receive a plurality of images of a target area and store the plurality of images in a first queue, the plurality of images being captured by a plurality of cameras. The operations can include executing a first container configured to: receive the plurality of images from the first queue; apply an image analysis model to the plurality of images to generate an image analysis result; and transmit the image analysis result to the distributed messaging platform, the distributed messaging platform being configured to receive the image analysis result and store the image analysis result in a second queue. The operations can include executing a second container that is separate from the first container, the second container being configured to: receive the image analysis result from the second queue; perform a post-processing operation on the image analysis result to generate a post-processing result; and transmit the post-processing result to the distributed messaging platform, the distributed messaging platform being configured to receive the post-processing result and store the post-processing result in a third queue. The operations can include executing one or more output containers that are separate from the first container and the second container, the one or more output containers being configured to: receive the post-processing result from the third queue; generate an alert notification based on the post-processing result; and transmit the alert notification to one or more recipient devices.

Another example of the present disclosure includes a method comprising operations. The operations can include executing a distributed messaging platform configured to receive a plurality of images of a target area and store the plurality of images in a first queue, the plurality of images being captured by a plurality of cameras. The operations can include executing a first container configured to: receive the plurality of images from the first queue; apply an image analysis model to the plurality of images to generate an image analysis result; and transmit the image analysis result to the distributed messaging platform, the distributed messaging platform being configured to receive the image analysis result and store the image analysis result in a second queue. The operations can include executing a second container that is separate from the first container, the second container being configured to: receive the image analysis result from the second queue; perform a post-processing operation on the image analysis result to generate a post-processing result; and transmit the post-processing result to the distributed messaging platform, the distributed messaging platform being configured to receive the post-processing result and store the post-processing result in a third queue. The operations can include executing one or more output containers that are separate from the first container and the second container, the one or more output containers being configured to: receive the post-processing result from the third queue; generate an alert notification based on the post-processing result; and transmit the alert notification to one or more recipient devices. Some or all of the operations can be executed by a plurality of processors.

Yet another example of the present disclosure can include a non-transitory computer-readable medium comprising program code that is executable by one or more processors for causing the one or more processors to perform operations. The operations can include executing a distributed messaging platform configured to receive a plurality of images of a target area and store the plurality of images in a first queue, the plurality of images being captured by a plurality of cameras. The operations can include executing a first container configured to: receive the plurality of images from the first queue; apply an image analysis model to the plurality of images to generate an image analysis result; and transmit the image analysis result to the distributed messaging platform, the distributed messaging platform being configured to receive the image analysis result and store the image analysis result in a second queue. The operations can include executing a second container that is separate from the first container, the second container being configured to: receive the image analysis result from the second queue; perform a post-processing operation on the image analysis result to generate a post-processing result; and transmit the post-processing result to the distributed messaging platform, the distributed messaging platform being configured to receive the post-processing result and store the post-processing result in a third queue. The operations can include executing one or more output containers that are separate from the first container and the second container, the one or more output containers being configured to: receive the post-processing result from the third queue; generate an alert notification based on the post-processing result; and transmit the alert notification to one or more recipient devices.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

BRIEF DESCRIPTION OF THE DRAWINGS

The present disclosure is described in conjunction with the appended figures.

Figure 1:
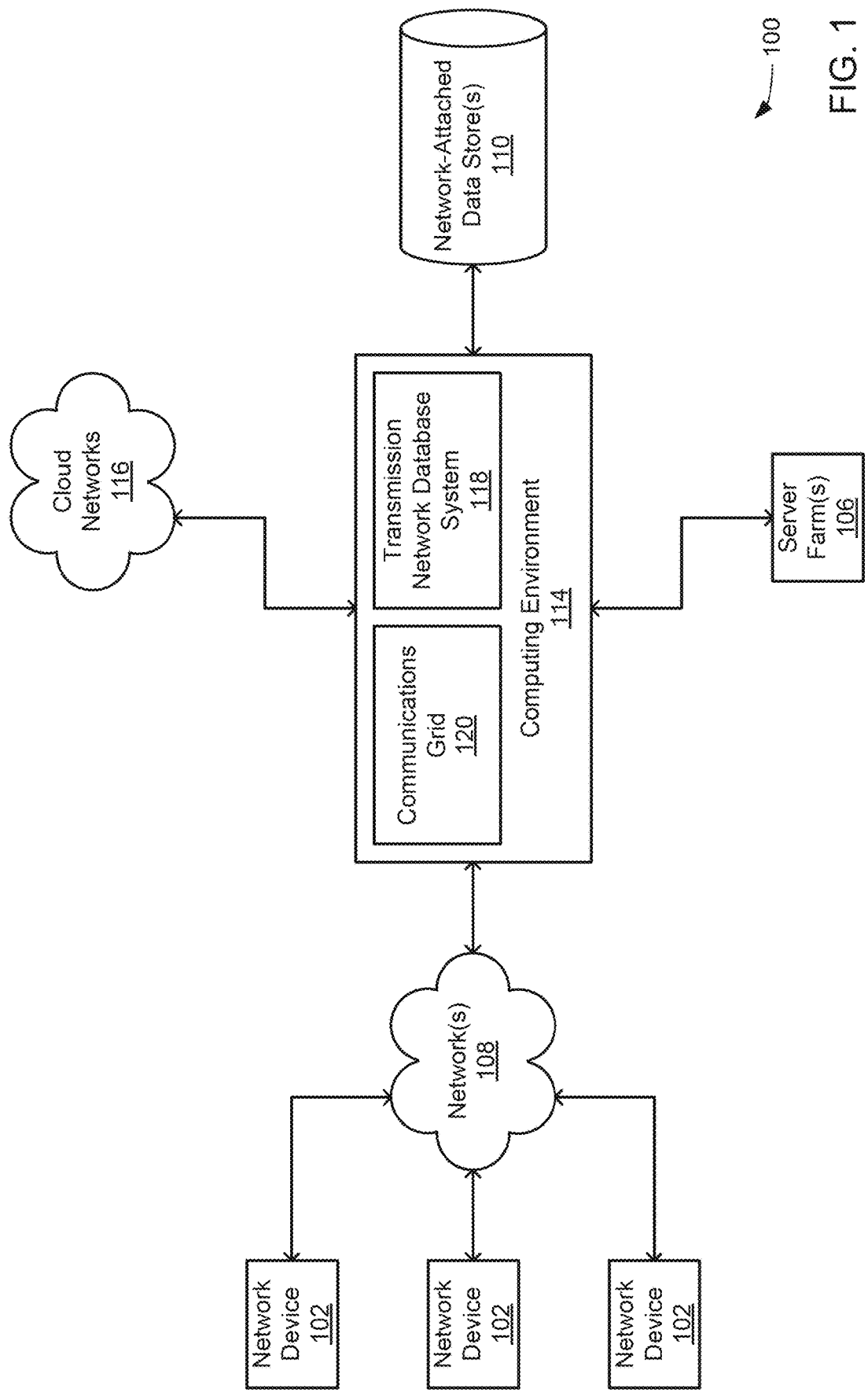
FIG. 1 shows an example of the hardware components of a data transmission network according to some aspects of the present disclosure.

In the appended figures, similar components or features can have the same reference number. Further, various components of the same type may be distinguished by following the reference number with a lowercase letter that distinguishes among the similar components. If only the first reference number is used in the specification, the description is applicable to any one of the similar components having the same first reference number irrespective of the lowercase letter.

DETAILED DESCRIPTION

Digital image analysis has been applied in a wide range of industries. Over time, the models used to perform digital image analysis have become more complex. For example, the field of computer vision often leverages artificial intelligence models to recognize objects in digital images and perform other tasks. While the underlying models used to perform digital image analysis have continued to advance, the general way in which digital image analysis is performed has remained relatively basic. For example, a computer generally executes image analysis software that was preprogrammed by a developer to include a specific model, where the model is designed to perform a specific image-analysis task. The image analysis software can receive an image, perform its predesignated image-analysis task, and output a result. But this basic approach can be inflexible, unreliable, and can exhibit poor performance. For example, if the computer executing the image analysis software experiences an error, it may delay or inhibit the image-analysis task (e.g., if image data is lost). As another example, because the image analysis software is usually preprogrammed to use a specific model that is designed for a specific image-analysis task, it can be inherently inflexible. If a user wishes to modify the model or image-analysis task, the user may need to update or replace the image analysis software. This can be difficult, cumbersome, and expensive, and may introduce downtime, vulnerabilities, and errors. As yet another example, the number of images that can be analyzed by the computer may be limited based on the amount of computing resources available on the computer and the capabilities of the image analysis software.

Some examples of the present disclosure can overcome one or more of the abovementioned problems by providing a flexible, extensible, and reliable computer architecture for use in performing digital image analysis. The computer architecture can combine together various technologies including containers, a distributed messaging platform, an on-premises computing cluster, and a cloud environment to achieve improvements to resiliency, speed, scalability, flexibility, and management in relation to performing digital image analysis. For example, the computer architecture can allow digital image analysis to be performed in a fault-tolerant manner on a large number of images transmitted (e.g., streamed in real time) from a dynamically adjustable number of cameras, where the digital image analysis can be implemented using any number and combination of models that can be easily selected and adjusted by the user. These and other features can enable the computer architecture to be customized and scaled as desired, allowing it to be applied to a wide variety of applications and scenarios.

As one specific example, a facility can operate one or more machines such as furnaces, turbines, pumps, computers, engravers, cutters, mixers, conveyors, or any combination of these. When the machines are operating, it may be unsafe for workers to be around the machines. To prevent injury, an operator of the facility may wish to detect workers within the vicinity of the machines when the machines are operational. To do so, the operator may install an automatic detection system that includes multiple cameras oriented toward various areas surrounding the machines. The automatic detection system may also include a computer architecture that is configured to receive and analyze images from the cameras for the purpose of detecting workers in the target areas. Rather than using a conventional solution such as a single computer running preprogrammed image analysis software, which may be unable to handle multiple concurrent streams of images from the multiple cameras, the operator can employ the flexible and extensible computer architecture of the present disclosure.

In some examples, the flexible computer architecture can include a computing duster, which may be located on the premises of the facility. Locating the computing cluster proximate to the cameras may reduce latency and bandwidth consumption. The computing cluster can include multiple nodes (e.g., physical or virtual servers) in networked communication with each other.

A container orchestration platform can be deployed on the computing cluster. Examples of the container orchestration platform can include Kubernetes®, RedHat OpenShift®, Docker Swarm®, and Amazon ECS®. The container orchestration platform can be used to deploy containers (e.g., Docker® containers) in the computing cluster. A container can be a relatively isolated virtual environment that can be deployed from an image file. Containers can be generated by leveraging the resource isolation features of the Linux kernel, such as cgroups and namespaces.

Among the containers that can be deployed in the computing cluster can be input containers. The input containers are containers that can receive images from the cameras. Each camera can have a corresponding input container in the computing cluster. As the number of cameras added to the system increases or decreases, the number of input containers can be scaled accordingly using the container orchestration platform to maintain a one-to-one arrangement of cameras-to-input containers. The input containers can be configured to transmit their received images to a distributed messaging platform. The input containers can also transmit alerts and heartbeat information (e.g., indicating the operational statuses of the corresponding cameras) to the distributed messaging platform.

A distributed messaging platform can be a platform that includes multiple nodes in networked communication with one another for use in performing messaging functions, such as receiving, processing, queuing, and delivering messages. In some examples, the messages may be event messages and the distributed messaging queue can store events and perform event stream processing. Examples of distributed messaging platforms can include Apache Kafka®, Rabbit MQ®, KubeMQ®, and Google Cloud Pub/Sub®. The distributed messaging platform can have high throughput and can be scalable, fault tolerant, highly available, and secure. The distributed messaging platform can store the images from the input containers in a first queue. A queue can be a data structure that stores information in a sequential order. The first queue can include a first-in-first-out (FIFO) queue or another type of queue.

The computing cluster can also include image analysis containers. The image analysis containers are containers that are executing software configured to receive images from the first queue and apply one or more image analysis models to the images to obtain image analysis results. In some examples, each image analysis container can be assigned to a particular camera or a particular set of cameras. In some such examples, each image analysis container can include software that is executable to receive a respective set of images associated with its assigned camera(s) from the first queue and apply one or more image analysis models to only those images. The image analysis models can be configured to perform various types of image analysis tasks. For example, the image analysis models can be configured to classify images into categories, detect whether a certain type of object is present in an image, recognize an object in an image, or determine the location of an object in an image. Any number of image analysis containers can be deployed and executed in parallel within the computing cluster to handle any number of images, improve performance, and provide redundancy and flexibility. After obtaining (e.g., generating or receiving) the image analysis results, the image analysis containers can transmit the image analysis results to the distributed messaging platform for storage in a second queue, which may be separate from the first queue. The second queue can include a FIFO queue or another type of queue.

In some examples, the image analysis containers (e.g., the software therein) can apply one or more image analysis models to the images by executing the models themselves. Additionally or alternatively, the image analysis containers can apply one or more image analysis models to the images by interfacing with an another system that can execute the models in relation to the images. For example, the image analysis containers can transmit commands to a cloud computing system that is separate from the computing cluster. In response to receiving the commands, the cloud computing system can apply one or more image analysis models to the images and return image analysis results to the image analysis containers. Locating one or more image analysis models outside the computing cluster, for example in a remote cloud computing environment, can make it easier to manage and adjust the models as desired. This may further improve the flexibility of the system.

Another example of containers that can be deployed in the computing cluster can include post-processing containers. The post-processing containers can receive the image analysis results from the second queue and apply one or more post-processing operations to the image analysis results to generate post-processing results. One example of a post-processing operation can include anonymizing image content. Anonymizing image content can involve obfuscating one or more portions of the image content for privacy purposes. For example, a post-processing container may obfuscate a portion of an image that provides personally identifiable information (PII), such as a name, license plate number, or address. The post-processing containers can then transmit the post-processing results to the distributed messaging platform for storage in a third queue, which may be distinct from the first queue and the second queue. The third queue can include a FIFO queue or another type of queue.

Any number of post-processing containers can be deployed in the computer cluster to perform any number and combination of post-processing operations on the image analysis results, further enhancing flexibility and customizability.

In some examples, the computing cluster can further include output containers. The output containers can include software configured to receive the image analysis results from the second queue and/or the post-processing results from the third queue. The output containers (e.g., the software therein) can then generate one or more alerts, reports, or other outputs based on the results. For example, the output containers can transmit or cause the transmission of one or more alert notifications to one or more recipient devices, such as laptop computers, mobile phones, or wearable devices (e.g., smart watches). The alert notifications can be transmitted, for example, if the system detects a worker in the target area associated with the machines. This may allow a recipient of the alert, such as a manager or other individual, to intervene before the worker is injured. Any number of output containers can be deployed in the computer cluster to perform any number and combination of output operations based on said results, further enhancing flexibility and customizability.

By using the computer architecture and features described above, the pipeline for performing digital image analysis can be broken down into customizable subparts that can be easily tailored and scaled as desired for a given application. The computer architecture can also be dynamically adjusted relatively easily and quickly, without performing major software revisions or upgrades. For example, the image analysis model stored on the cloud computing system can be quickly and easily replaced with another model, which may perform the same image-analysis task in an improved manner (e.g., with greater accuracy) or may perform an entirely different image-analysis task, with minimal impact on the rest of the computer architecture. As another example, additional cameras can be easily added to the system by simply scaling up the number of input containers and, in some cases, the number of image analysis containers. Scaling up the number of input containers and the number of image analysis containers can be relatively straightforward using the container orchestration platform, and may have relatively little impact on the rest of the computer architecture that is already running.

These illustrative examples are given to introduce the reader to the general subject matter discussed here and are not intended to limit the scope of the disclosed concepts. For example, the computer architecture and features described herein can be applied in other contexts beyond the detection of people in a monitored zone, including detecting the number of customers in a store, detecting certain objects on conveyor belts, and detecting faulty products. The following sections describe various additional features and examples with reference to the drawings in which like numerals indicate like elements but, like the illustrative examples, should not be used to limit the present disclosure.

FIG. 1 is a block diagram that provides an illustration of the hardware components of a data transmission network 100, according to embodiments of the present technology. Data transmission network 100 is a specialized computer system that may be used for processing large amounts of data where a large number of computer processing cycles are required.

Data transmission network 100 may also include computing environment 114. Computing environment 114 may be a specialized computer or other machine that processes the data received within the data transmission network 100.

Data transmission network 100 also includes one or more network devices 102. Network devices 102 may include client devices that attempt to communicate with computing environment 114. For example, network devices 102 may send data to the computing environment 114 to be processed, may send signals to the computing environment 114 to control different aspects of the computing environment or the data it is processing, among other reasons. Network devices 102 may interact with the computing environment 114 through a number of ways, such as, for example, over one or more networks 108. As shown in FIG. 1, computing environment 114 may include one or more other systems. For example, computing environment 114 may include a database system 118 and/or a communications grid 120.

Figure 8:
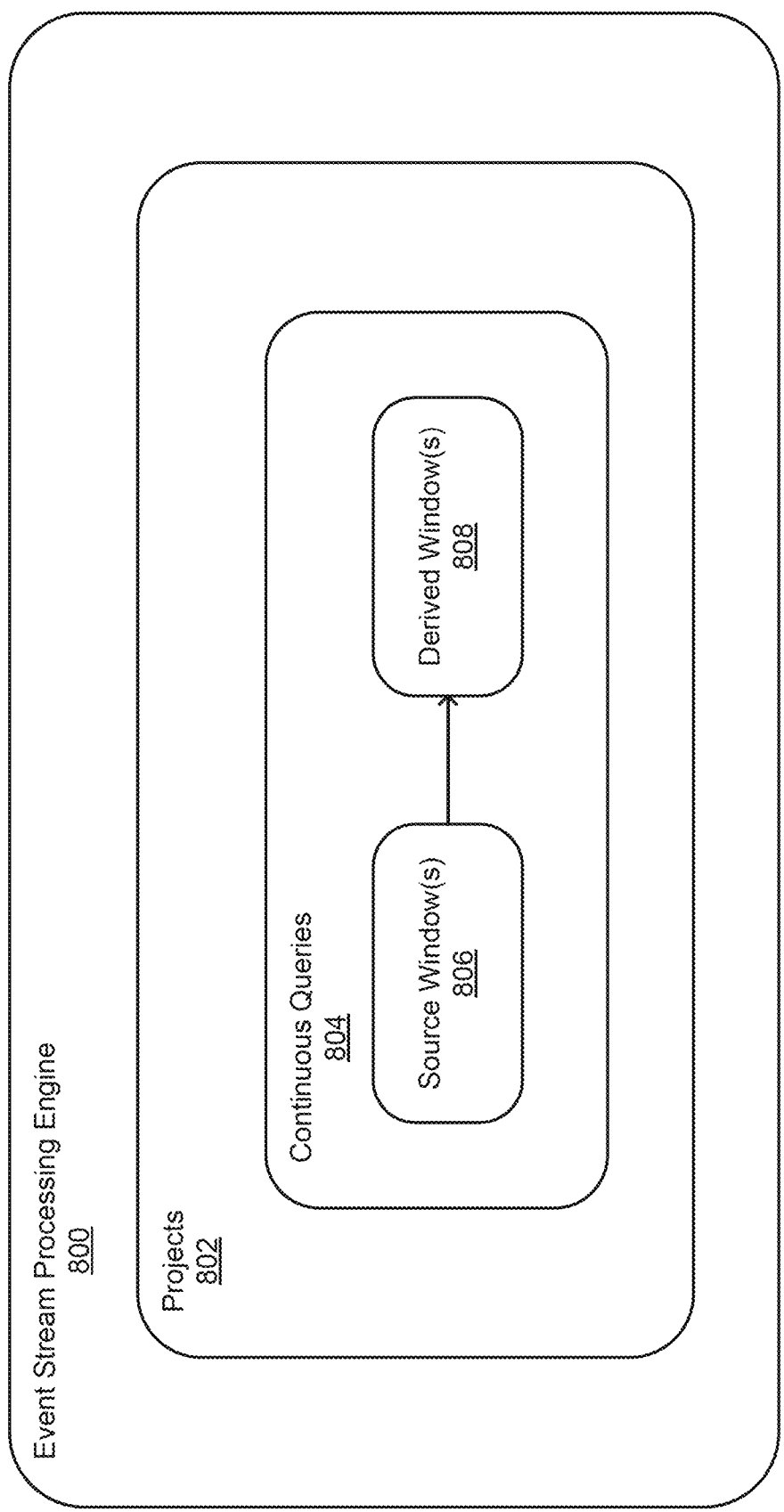
FIG. 8 shows a block diagram including components of an Event Stream Processing Engine (ESPE) according to some aspects of the present disclosure.
Figure 9:
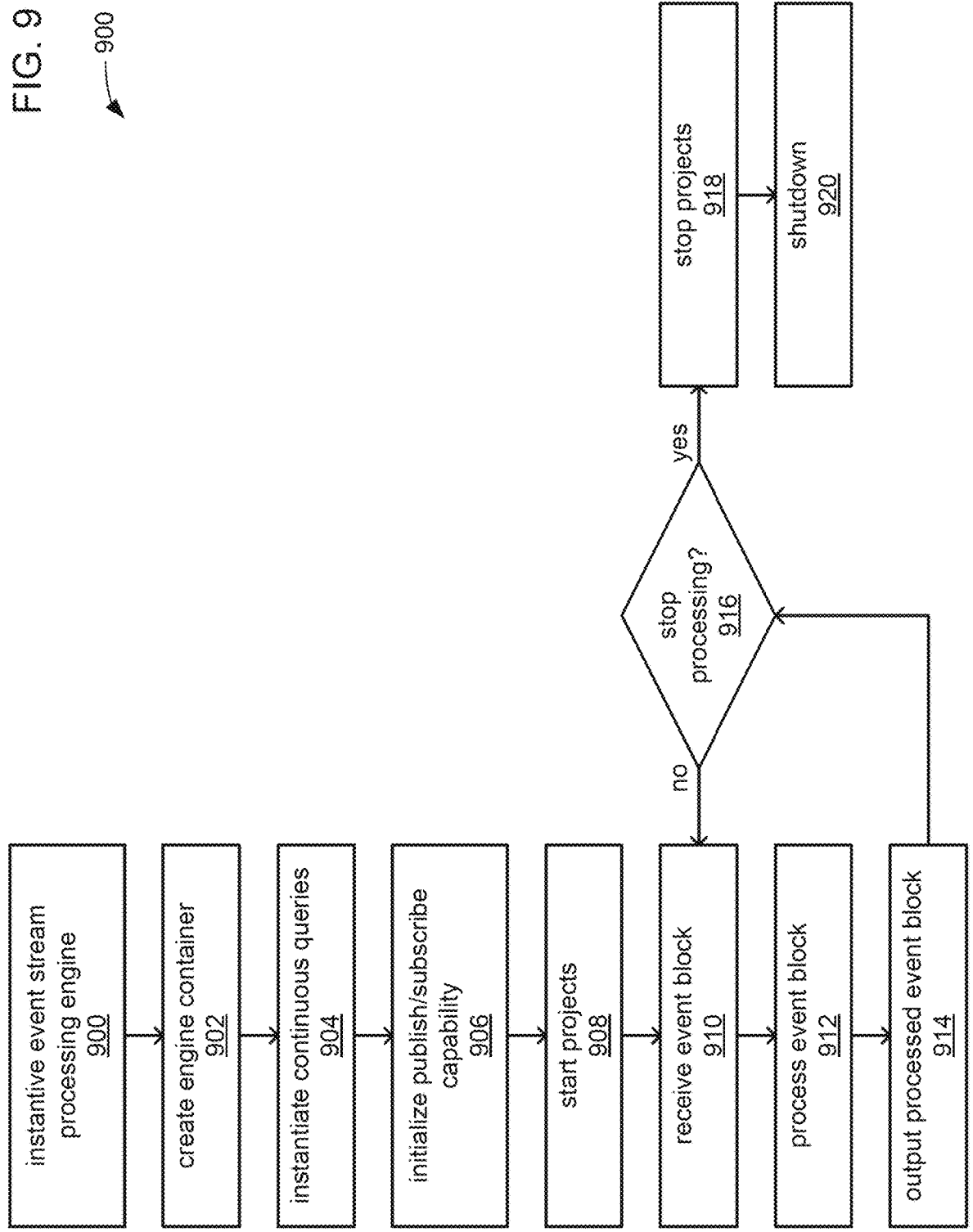
FIG. 9 shows a flow chart of an example process including operations performed by an event stream processing engine according to some aspects of the present disclosure.
Figure 10:
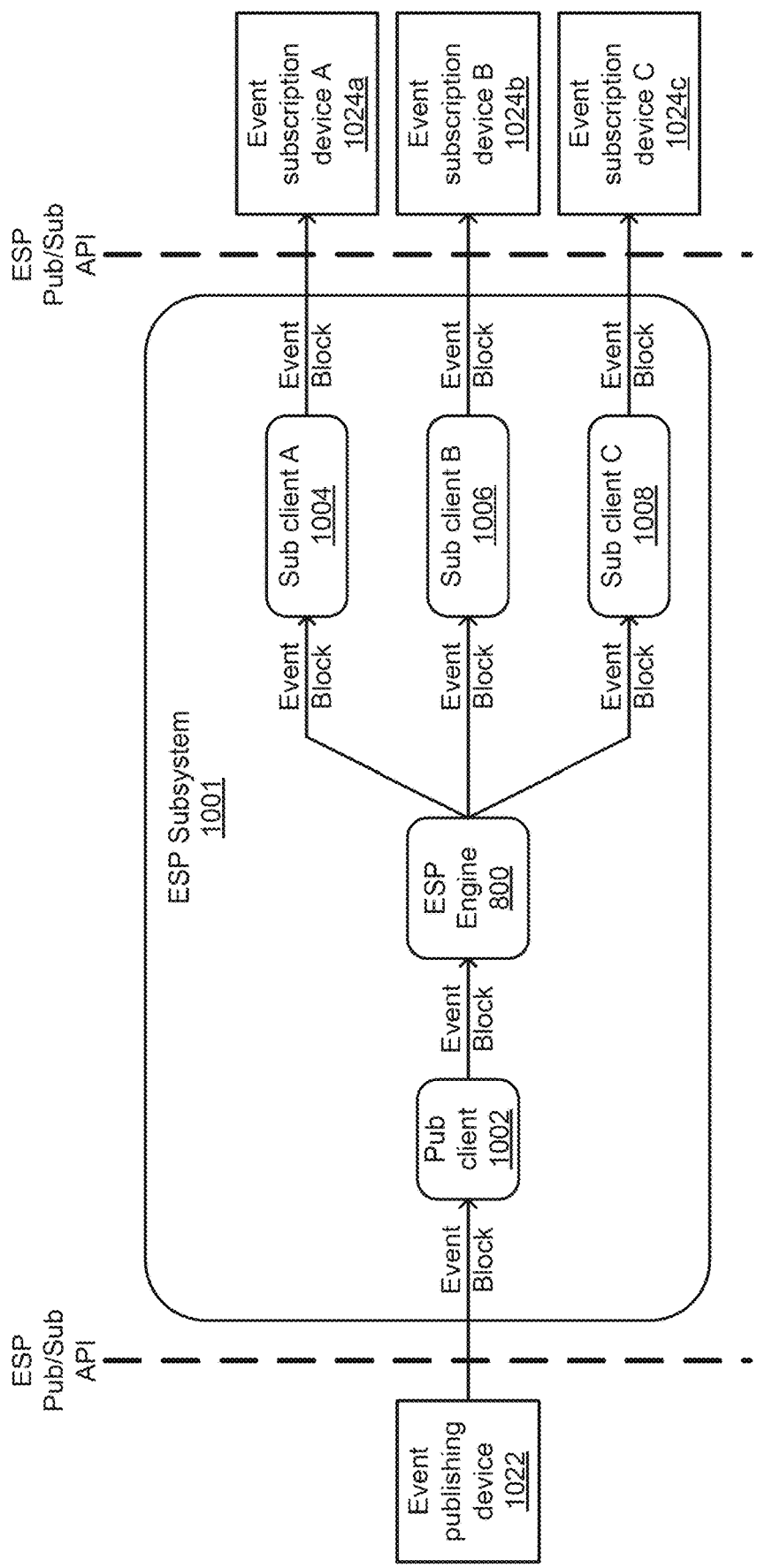
FIG. 10 shows an ESP system interfacing between publishing device and event subscribing devices according to some aspects of the present disclosure.

In other embodiments, network devices 102 may provide a large amount of data, either all at once or streaming over a period of time (e.g., using event stream processing (ESP), described further with respect to FIGS. 8-10), to the computing environment 114 via networks 108. For example, network devices 102 may include network computers, sensors, databases, or other devices that may transmit or otherwise provide data to computing environment 114. For example, network devices 102 may include local area network devices, such as routers, hubs, switches, or other computer networking devices. These devices may provide a variety of stored or generated data, such as network data or data specific to the network devices themselves. Network devices 102 may also include sensors that monitor their environment or other devices to collect data regarding that environment or those devices, and such network devices may provide data they collect over time. Network devices 102 may also include devices within the internet of things, such as devices within a home automation network. Some of these devices may be referred to as edge devices, and may involve edge computing circuitry. Data may be transmitted by network devices 102 directly to computing environment 114 or to network-attached data stores, such as network-attached data stores 110 for storage so that the data may be retrieved later by the computing environment 114 or other portions of data transmission network 100.

Data transmission network 100 may also include one or more network-attached data stores 110. Network-attached data stores 110 are used to store data to be processed by the computing environment 114 as well as any intermediate or final data generated by the computing system in non-volatile memory. However, in certain embodiments, the configuration of the computing environment 114 allows its operations to be performed such that intermediate and final data results can be stored solely in volatile memory (e.g., RAM), without a requirement that intermediate or final data results be stored to non-volatile types of memory (e.g., disk). This can be useful in certain situations, such as when the computing environment 114 receives ad hoc queries from a user and when responses, which are generated by processing large amounts of data, need to be generated on-the-fly. In this non-limiting situation, the computing environment 114 may be configured to retain the processed information within memory so that responses can be generated for the user at different levels of detail as well as allow a user to interactively query against this information.

Network-attached data stores 110 may store a variety of different types of data organized in a variety of different ways and from a variety of different sources. For example, network-attached data storage may include storage other than primary storage located within computing environment 114 that is directly accessible by processors located therein. Network-attached data storage may include secondary, tertiary or auxiliary storage, such as large hard drives, servers, virtual memory, among other types. Storage devices may include portable or non-portable storage devices, optical storage devices, and various other mediums capable of storing or containing data. A machine-readable storage medium or computer-readable storage medium may include a non-transitory medium in which data can be stored and that does not include carrier waves and/or transitory electronic signals. Examples of a non-transitory medium may include, for example, a magnetic disk or tape, optical storage media such as compact disk or digital versatile disk, flash memory, memory or memory devices. A computer-program product may include code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, and network transmission, among others. Furthermore, the data stores may hold a variety of different types of data. For example, network-attached data stores 110 may hold unstructured (e.g., raw) data, such as manufacturing data (e.g., a database containing records identifying products being manufactured with parameter data for each product, such as colors and models) or product sales databases (e.g., a database containing individual data records identifying details of individual product sales).

The unstructured data may be presented to the computing environment 114 in different forms such as a flat file or a conglomerate of data records, and may have data values and accompanying time stamps. The computing environment 114 may be used to analyze the unstructured data in a variety of ways to determine the best way to structure (e.g., hierarchically) that data, such that the structured data is tailored to a type of further analysis that a user wishes to perform on the data. For example, after being processed, the unstructured time stamped data may be aggregated by time (e.g., into daily time period units) to generate time series data and/or structured hierarchically according to one or more dimensions (e.g., parameters, attributes, and/or variables). For example, data may be stored in a hierarchical data structure, such as a ROLAP OR MOLAP database, or may be stored in another tabular form, such as in a flat-hierarchy form.

Data transmission network 100 may also include one or more server farms 106. Computing environment 114 may route select communications or data to the one or more sever farms 106 or one or more servers within the server farms. Server farms 106 can be configured to provide information in a predetermined manner. For example, server farms 106 may access data to transmit in response to a communication. Server farms 106 may be separately housed from each other device within data transmission network 100, such as computing environment 114, and/or may be part of a device or system.

Server farms 106 may host a variety of different types of data processing as part of data transmission network 100. Server farms 106 may receive a variety of different data from network devices 102, from computing environment 114, from cloud network 116, or from other sources. The data may have been obtained or collected from one or more sensors, as inputs from a control database, or may have been received as inputs from an external system or device. Server farms 106 may assist in processing the data by turning raw data into processed data based on one or more rules implemented by the server farms. For example, sensor data may be analyzed to determine changes in an environment over time or in real-time.

Data transmission network 100 may also include one or more cloud networks 116. Cloud network 116 may include a cloud infrastructure system that provides cloud services. In certain embodiments, services provided by the cloud network 116 may include a host of services that are made available to users of the cloud infrastructure system on demand. Cloud network 116 is shown in FIG. 1 as being connected to computing environment 114 (and therefore having computing environment 114 as its client or user), but cloud network 116 may be connected to or utilized by any of the devices in FIG. 1. Services provided by the cloud network can dynamically scale to meet the needs of its users. The cloud network 116 may include one or more computers, servers, and/or systems. In some embodiments, the computers, servers, and/or systems that make up the cloud network 116 are different from the user's own on-premises computers, servers, and/or systems. For example, the cloud network 116 may host an application, and a user may, via a communication network such as the Internet, on demand, order and use the application.

While each device, server and system in FIG. 1 is shown as a single device, it will be appreciated that multiple devices may instead be used. For example, a set of network devices can be used to transmit various communications from a single user, or remote server may include a server stack. As another example, data may be processed as part of computing environment 114.

Each communication within data transmission network 100 (e.g., between client devices, between servers 106 and computing environment 114 or between a server and a device) may occur over one or more networks 108. Networks 108 may include one or more of a variety of different types of networks, including a wireless network, a wired network, or a combination of a wired and wireless network. Examples of suitable networks include the Internet, a personal area network, a local area network (LAN), a wide area network (WAN), or a wireless local area network (WLAN). A wireless network may include a wireless interface or combination of wireless interfaces. As an example, a network in the one or more networks 108 may include a short-range communication channel, such as a BLUETOOTH® communication channel or a BLUETOOTH® Low Energy communication channel. A wired network may include a wired interface. The wired and/or wireless networks may be implemented using routers, access points, bridges, gateways, or the like, to connect devices in the network 108, as will be further described with respect to FIG. 2. The one or more networks 108 can be incorporated entirely within or can include an intranet, an extranet, or a combination thereof. In one embodiment, communications between two or more systems and/or devices can be achieved by a secure communications protocol, such as secure sockets layer (SSL) or transport layer security (TLS). In addition, data and/or transactional details may be encrypted.

Some aspects may utilize the Internet of Things (IoT), where things (e.g., machines, devices, phones, sensors) can be connected to networks and the data from these things can be collected and processed within the things and/or external to the things. For example, the IoT can include sensors in many different devices, and high value analytics can be applied to identify hidden relationships and drive increased efficiencies. This can apply to both big data analytics and real-time (e.g., ESP) analytics. This will be described further below with respect to FIG. 2.

As noted, computing environment 114 may include a communications grid 120 and a transmission network database system 118. Communications grid 120 may be a grid-based computing system for processing large amounts of data. The transmission network database system 118 may be for managing, storing, and retrieving large amounts of data that are distributed to and stored in the one or more network-attached data stores 110 or other data stores that reside at different locations within the transmission network database system 118. The compute nodes in the grid-based computing system 120 and the transmission network database system 118 may share the same processor hardware, such as processors that are located within computing environment 114.

Figure 2:
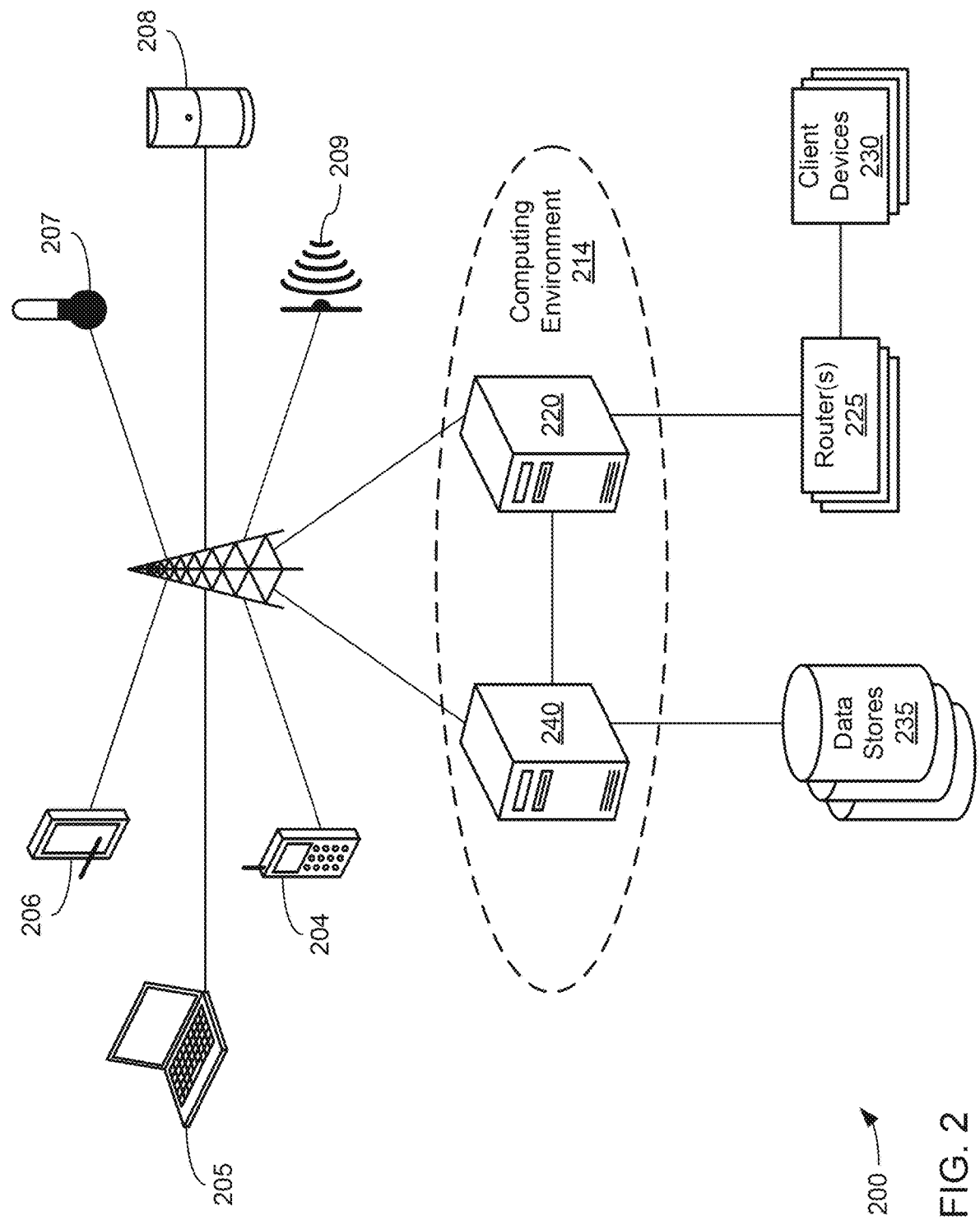
FIG. 2 shows an example network including an example set of devices communicating with each other over an exchange system according to some aspects of the present disclosure.

FIG. 2 illustrates an example network including an example set of devices communicating with each other over an exchange system and via a network, according to embodiments of the present technology. As noted, each communication within data transmission network 100 may occur over one or more networks. System 200 includes a network device 204 configured to communicate with a variety of types of client devices, for example client devices 230, over a variety of types of communication channels.

As shown in FIG. 2, network device 204 can transmit a communication over a network (e.g., a cellular network via a base station). The communication can be routed to another network device, such as network devices 205-209, via base station. The communication can also be routed to computing environment 214 via base station. For example, network device 204 may collect data either from its surrounding environment or from other network devices (such as network devices 205-209) and transmit that data to computing environment 214.

Although network devices 204-209 are shown in FIG. 2 as a mobile phone, laptop computer, tablet computer, temperature sensor, motion sensor, and audio sensor respectively, the network devices may be or include sensors that are sensitive to detecting characteristics of their environment. For example, the network devices may include sensors such as water sensors, power sensors, electrical current sensors, chemical sensors, optical sensors, pressure sensors, geographic or position sensors (e.g., GPS), velocity sensors, acceleration sensors, flow rate sensors, among others. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. The sensors may be mounted to various components used as part of a variety of different types of systems (e.g., an oil drilling operation). The network devices may detect and record data related to the environment that it monitors, and transmit that data to computing environment 214.

As noted, one type of system that may include various sensors that collect data to be processed and/or transmitted to a computing environment according to certain embodiments includes an oil drilling system. For example, the one or more drilling operation sensors may include surface sensors that measure a hook load, a fluid rate, a temperature and a density in and out of the wellbore, a standpipe pressure, a surface torque, a rotation speed of a drill pipe, a rate of penetration, a mechanical specific energy, etc., and downhole sensors that measure a rotation speed of a bit, fluid densities, downhole torque, downhole vibration (axial, tangential, lateral), a weight applied at a drill bit, an annular pressure, a differential pressure, an azimuth, an inclination, a dog leg severity, a measured depth, a vertical depth, a downhole temperature, etc. Besides the raw data collected directly by the sensors, other data may include parameters either developed by the sensors or assigned to the system by a client or other controlling device. For example, one or more drilling operation control parameters may control settings such as a mud motor speed to flow ratio, a bit diameter, a predicted formation top, seismic data, weather data, etc. Other data may be generated using physical models such as an earth model, a weather model, a seismic model, a bottom hole assembly model, a well plan model, an annular friction model, etc. In addition to sensor and control settings, predicted outputs, of for example, the rate of penetration, mechanical specific energy, hook load, flow in fluid rate, flow out fluid rate, pump pressure, surface torque, rotation speed of the drill pipe, annular pressure, annular friction pressure, annular temperature, equivalent circulating density, etc. may also be stored in the data warehouse.

In another example, another type of system that may include various sensors that collect data to be processed and/or transmitted to a computing environment according to certain embodiments includes a home automation or similar automated network in a different environment, such as an office space, school, public space, sports venue, or a variety of other locations. Network devices in such an automated network may include network devices that allow a user to access, control, and/or configure various home appliances located within the user's home (e.g., a television, radio, light, fan, humidifier, sensor, microwave, iron, and/or the like), or outside of the user's home (e.g., exterior motion sensors, exterior lighting, garage door openers, sprinkler systems, or the like). For example, network device 102 may include a home automation switch that may be coupled with a home appliance. In another embodiment, a network device can allow a user to access, control, and/or configure devices, such as office-related devices (e.g., copy machine, printer, or fax machine), audio and/or video related devices (e.g., a receiver, a speaker, a projector, a DVD player, or a television), media-playback devices (e.g., a compact disc player, a CD player, or the like), computing devices (e.g., a home computer, a laptop computer, a tablet, a personal digital assistant (PDA), a computing device, or a wearable device), lighting devices (e.g., a lamp or recessed lighting), devices associated with a security system, devices associated with an alarm system, devices that can be operated in an automobile (e.g., radio devices, navigation devices), and/or the like. Data may be collected from such various sensors in raw form, or data may be processed by the sensors to create parameters or other data either developed by the sensors based on the raw data or assigned to the system by a client or other controlling device.

In another example, another type of system that may include various sensors that collect data to be processed and/or transmitted to a computing environment according to certain embodiments includes a power or energy grid. A variety of different network devices may be included in an energy grid, such as various devices within one or more power plants, energy farms (e.g., wind farm, solar farm, among others) energy storage facilities, factories, homes and businesses of consumers, among others. One or more of such devices may include one or more sensors that detect energy gain or loss, electrical input or output or loss, and a variety of other efficiencies. These sensors may collect data to inform users of how the energy grid, and individual devices within the grid, may be functioning and how they may be made more efficient.

Network device sensors may also perform processing on data they collect before transmitting the data to the computing environment 114, or before deciding whether to transmit data to the computing environment 114. For example, network devices may determine whether data collected meets certain rules, for example by comparing data or values calculated from the data and comparing that data to one or more thresholds. The network device may use this data and/or comparisons to determine if the data should be transmitted to the computing environment 214 for further use or processing.

Computing environment 214 may include machines 220 and 240. Although computing environment 214 is shown in FIG. 2 as having two machines, 220 and 240, computing environment 214 may have only one machine or may have more than two machines. The machines that make up computing environment 214 may include specialized computers, servers, or other machines that are configured to individually and/or collectively process large amounts of data. The computing environment 214 may also include storage devices that include one or more databases of structured data, such as data organized in one or more hierarchies, or unstructured data. The databases may communicate with the processing devices within computing environment 214 to distribute data to them. Since network devices may transmit data to computing environment 214, that data may be received by the computing environment 214 and subsequently stored within those storage devices. Data used by computing environment 214 may also be stored in data stores 235, which may also be a part of or connected to computing environment 214.

Computing environment 214 can communicate with various devices via one or more routers 225 or other inter-network or intra-network connection components. For example, computing environment 214 may communicate with client devices 230 via one or more routers 225. Computing environment 214 may collect, analyze and/or store data from or pertaining to communications, client device operations, client rules, and/or user-associated actions stored at one or more data stores 235. Such data may influence communication routing to the devices within computing environment 214, how data is stored or processed within computing environment 214, among other actions.

Notably, various other devices can further be used to influence communication routing and/or processing between devices within computing environment 214 and with devices outside of computing environment 214. For example, as shown in FIG. 2, computing environment 214 may include a machine 240 that is a web server. Thus, computing environment 214 can retrieve data of interest, such as client information (e.g., product information, client rules, etc.), technical product details, news, current or predicted weather, and so on.

In addition to computing environment 214 collecting data (e.g., as received from network devices, such as sensors, and client devices or other sources) to be processed as part of a big data analytics project, it may also receive data in real time as part of a streaming analytics environment. As noted, data may be collected using a variety of sources as communicated via different kinds of networks or locally. Such data may be received on a real-time streaming basis. For example, network devices may receive data periodically from network device sensors as the sensors continuously sense, monitor and track changes in their environments.

Devices within computing environment 214 may also perform pre-analysis on data it receives to determine if the data received should be processed as part of an ongoing project. The data received and collected by computing environment 214, no matter what the source or method or timing of receipt, may be processed over a period of time for a client to determine results data based on the client's needs and rules.

Figure 3:
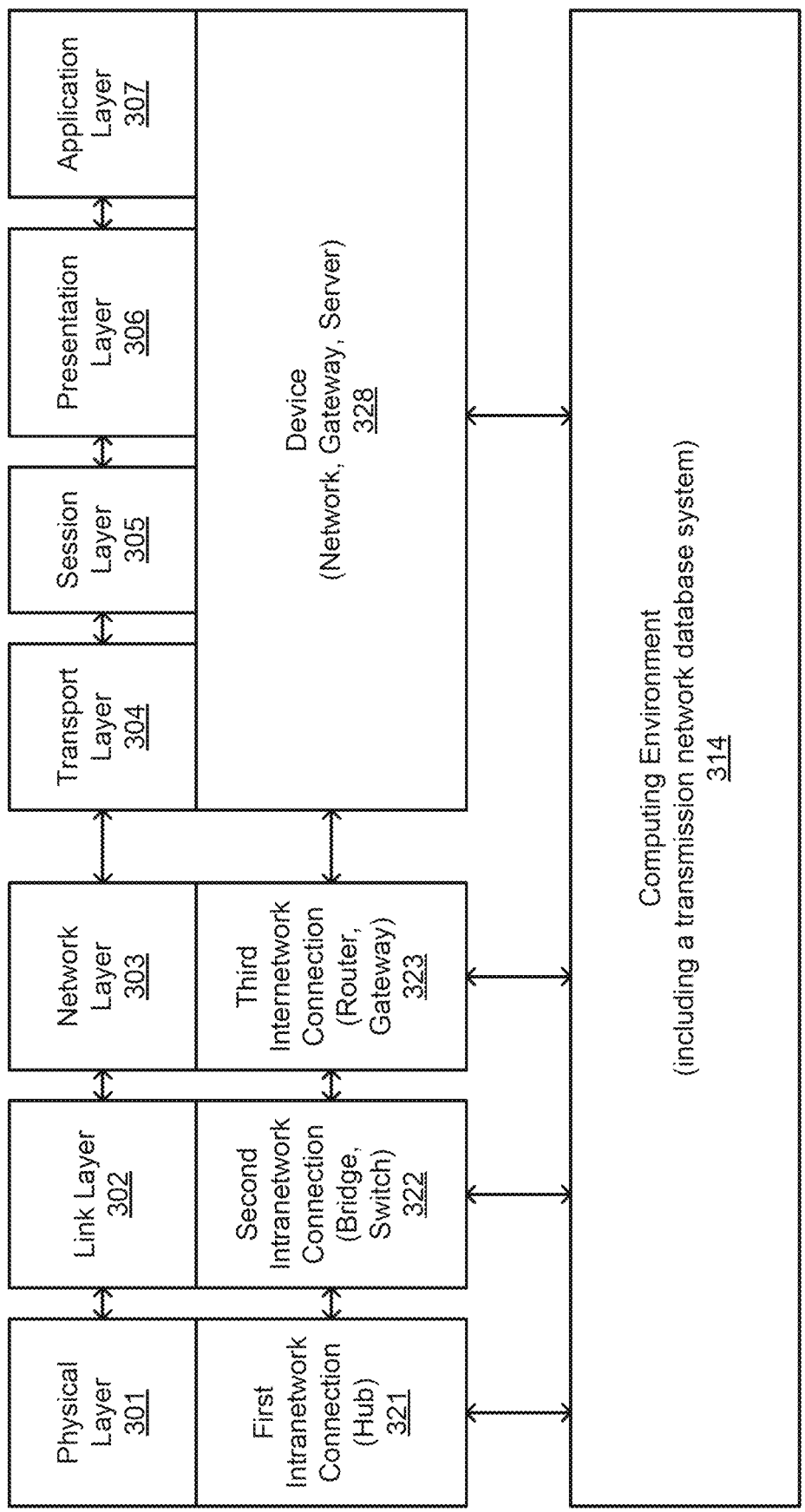
FIG. 3 shows an example representation of a conceptual model of a communications protocol system according to some aspects of the present disclosure.

FIG. 3 illustrates a representation of a conceptual model of a communications protocol system, according to embodiments of the present technology. More specifically, FIG. 3 identifies operation of a computing environment in an Open Systems Interaction model that corresponds to various connection components. The model 300 shows, for example, how a computing environment, such as computing environment 314 (or computing environment 214 in FIG. 2) may communicate with other devices in its network, and control how communications between the computing environment and other devices are executed and under what conditions.

The model can include layers 301-307. The layers are arranged in a stack. Each layer in the stack serves the layer one level higher than it (except for the application layer, which is the highest layer), and is served by the layer one level below it (except for the physical layer, which is the lowest layer). The physical layer is the lowest layer because it receives and transmits raw bites of data, and is the farthest layer from the user in a communications system. On the other hand, the application layer is the highest layer because it interacts directly with a software application.

As noted, the model includes a physical layer 301. Physical layer 301 represents physical communication, and can define parameters of that physical communication. For example, such physical communication may come in the form of electrical, optical, or electromagnetic signals. Physical layer 301 also defines protocols that may control communications within a data transmission network.

Link layer 302 defines links and mechanisms used to transmit (i.e., move) data across a network. The link layer 302 manages node-to-node communications, such as within a grid computing environment. Link layer 302 can detect and correct errors (e.g., transmission errors in the physical layer 301). Link layer 302 can also include a media access control (MAC) layer and logical link control (LLC) layer.

Network layer 303 defines the protocol for routing within a network. In other words, the network layer coordinates transferring data across nodes in a same network (e.g., such as a grid computing environment). Network layer 303 can also define the processes used to structure local addressing within the network.

Transport layer 304 can manage the transmission of data and the quality of the transmission and/or receipt of that data. Transport layer 304 can provide a protocol for transferring data, such as, for example, a Transmission Control Protocol (TCP). Transport layer 304 can assemble and disassemble data frames for transmission. The transport layer can also detect transmission errors occurring in the layers below it.

Session layer 305 can establish, maintain, and manage communication connections between devices on a network. In other words, the session layer controls the dialogues or nature of communications between network devices on the network. The session layer may also establish checkpointing, adjournment, termination, and restart procedures.

Presentation layer 306 can provide translation for communications between the application and network layers. In other words, this layer may encrypt, decrypt and/or format data based on data types and/or encodings known to be accepted by an application or network layer.

Application layer 307 interacts directly with software applications and end users, and manages communications between them. Application layer 307 can identify destinations, local resource states or availability and/or communication content or formatting using the applications.

Intra-network connection components 321 and 322 are shown to operate in lower levels, such as physical layer 301 and link layer 302, respectively. For example, a hub can operate in the physical layer, a switch can operate in the link layer, and a router can operate in the network layer. Inter-network connection components 323 and 328 are shown to operate on higher levels, such as layers 303-307. For example, routers can operate in the network layer and network devices can operate in the transport, session, presentation, and application layers.

As noted, a computing environment 314 can interact with and/or operate on, in various embodiments, one, more, all or any of the various layers. For example, computing environment 314 can interact with a hub (e.g., via the link layer) so as to adjust which devices the hub communicates with. The physical layer may be served by the link layer, so it may implement such data from the link layer. For example, the computing environment 314 may control which devices it will receive data from. For example, if the computing environment 314 knows that a certain network device has turned off, broken, or otherwise become unavailable or unreliable, the computing environment 314 may instruct the hub to prevent any data from being transmitted to the computing environment 314 from that network device. Such a process may be beneficial to avoid receiving data that is inaccurate or that has been influenced by an uncontrolled environment. As another example, computing environment 314 can communicate with a bridge, switch, router or gateway and influence which device within the system (e.g., system 200) the component selects as a destination. In some embodiments, computing environment 314 can interact with various layers by exchanging communications with equipment operating on a particular layer by routing or modifying existing communications. In another embodiment, such as in a grid computing environment, a node may determine how data within the environment should be routed (e.g., which node should receive certain data) based on certain parameters or information provided by other layers within the model.

As noted, the computing environment 314 may be a part of a communications grid environment, the communications of which may be implemented as shown in the protocol of FIG. 3. For example, referring back to FIG. 2, one or more of machines 220 and 240 may be part of a communications grid computing environment. A gridded computing environment may be employed in a distributed system with non-interactive workloads where data resides in memory on the machines, or compute nodes. In such an environment, analytic code, instead of a database management system, controls the processing performed by the nodes. Data is co-located by pre-distributing it to the grid nodes, and the analytic code on each node loads the local data into memory. Each node may be assigned a particular task such as a portion of a processing project, or to organize or control other nodes within the grid.

Figure 4:
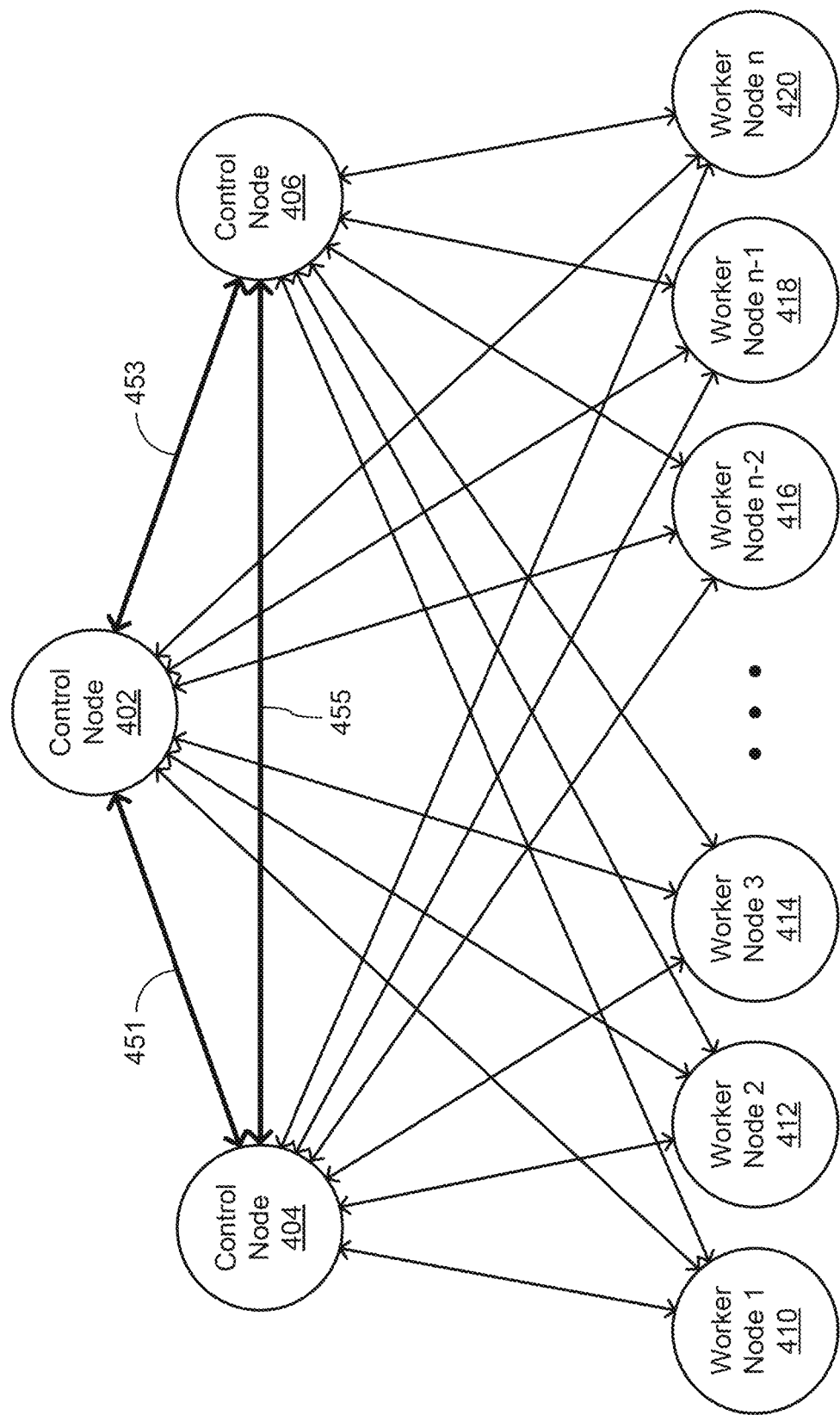
FIG. 4 shows a communications grid computing system including a variety of control and worker nodes according to some aspects of the present disclosure.

FIG. 4 illustrates a communications grid computing system 400 including a variety of control and worker nodes, according to embodiments of the present technology. Communications grid computing system 400 includes three control nodes and one or more worker nodes. Communications grid computing system 400 includes control nodes 402, 404, and 406. The control nodes are communicatively connected via communication paths 451, 453, and 455. Therefore, the control nodes may transmit information (e.g., related to the communications grid or notifications), to and receive information from each other. Although communications grid computing system 400 is shown in FIG. 4 as including three control nodes, the communications grid may include more or less than three control nodes.

Communications grid computing system (or just "communications grid") 400 also includes one or more worker nodes. Shown in FIG. 4 are six worker nodes 410-420. Although FIG. 4 shows six worker nodes, a communications grid according to embodiments of the present technology may include more or less than six worker nodes. The number of worker nodes included in a communications grid may be dependent upon how large the project or data set is being processed by the communications grid, the capacity of each worker node, the time designated for the communications grid to complete the project, among others. Each worker node within the communications grid 400 may be connected (wired or wirelessly, and directly or indirectly) to control nodes 402-406. Therefore, each worker node may receive information from the control nodes (e.g., an instruction to perform work on a project) and may transmit information to the control nodes (e.g., a result from work performed on a project). Furthermore, worker nodes may communicate with each other (either directly or indirectly). For example, worker nodes may transmit data between each other related to a job being performed or an individual task within a job being performed by that worker node. However, in certain embodiments, worker nodes may not, for example, be connected (communicatively or otherwise) to certain other worker nodes. In an embodiment, worker nodes may only be able to communicate with the control node that controls it, and may not be able to communicate with other worker nodes in the communications grid, whether they are other worker nodes controlled by the control node that controls the worker node, or worker nodes that are controlled by other control nodes in the communications grid.

A control node may connect with an external device with which the control node may communicate (e.g., a grid user, such as a server or computer, may connect to a controller of the grid). For example, a server or computer may connect to control nodes and may transmit a project or job to the node. The project may include a data set. The data set may be of any size. Once the control node receives such a project including a large data set, the control node may distribute the data set or projects related to the data set to be performed by worker nodes. Alternatively, for a project including a large data set, the data set may be received or stored by a machine other than a control node (e.g., a HADOOP® standard-compliant data node employing the HADOOP® Distributed File System, or HDFS).

Control nodes may maintain knowledge of the status of the nodes in the grid (i.e., grid status information), accept work requests from clients, subdivide the work across worker nodes, and coordinate the worker nodes, among other responsibilities. Worker nodes may accept work requests from a control node and provide the control node with results of the work performed by the worker node. A grid may be started from a single node (e.g., a machine, computer, server, etc.). This first node may be assigned or may start as the primary control node that will control any additional nodes that enter the grid.

When a project is submitted for execution (e.g., by a client or a controller of the grid) it may be assigned to a set of nodes. After the nodes are assigned to a project, a data structure (i.e., a communicator) may be created. The communicator may be used by the project for information to be shared between the project codes running on each node. A communication handle may be created on each node. A handle, for example, is a reference to the communicator that is valid within a single process on a single node, and the handle may be used when requesting communications between nodes.

A control node, such as control node 402, may be designated as the primary control node. A server, computer or other external device may connect to the primary control node. Once the control node receives a project, the primary control node may distribute portions of the project to its worker nodes for execution. For example, when a project is initiated on communications grid 400, primary control node 402 controls the work to be performed for the project in order to complete the project as requested or instructed. The primary control node may distribute work to the worker nodes based on various factors, such as which subsets or portions of projects may be completed most efficiently and in the correct amount of time. For example, a worker node may perform analysis on a portion of data that is already local to (e.g., stored on) the worker node. The primary control node also coordinates and processes the results of the work performed by each worker node after each worker node executes and completes its job. For example, the primary control node may receive a result from one or more worker nodes, and the control node may organize (e.g., collect and assemble) the results received and compile them to produce a complete result for the project received from the end user.

Any remaining control nodes, such as control nodes 404 and 406, may be assigned as backup control nodes for the project. In an embodiment, backup control nodes may not control any portion of the project. Instead, backup control nodes may serve as a backup for the primary control node and take over as primary control node if the primary control node were to fail. If a communications grid were to include only a single control node, and the control node were to fail (e.g., the control node is shut off or breaks), then the communications grid as a whole may fail and any project or job being run on the communications grid may fail and may not complete. While the project may be run again, such a failure may cause a delay (severe delay in some cases, such as overnight delay) in completion of the project. Therefore, a grid with multiple control nodes, including a backup control node, may be beneficial.

To add another node or machine to the grid, the primary control node may open a pair of listening sockets, for example. A socket may be used to accept work requests from clients, and the second socket may be used to accept connections from other grid nodes. The primary control node may be provided with a list of other nodes (e.g., other machines, computers, servers) that will participate in the grid, and the role that each node will fill in the grid. Upon startup of the primary control node (e.g., the first node on the grid), the primary control node may use a network protocol to start the server process on every other node in the grid. Command line parameters, for example, may inform each node of one or more pieces of information, such as: the role that the node will have in the grid, the host name of the primary control node, and the port number on which the primary control node is accepting connections from peer nodes, among others. The information may also be provided in a configuration file, transmitted over a secure shell tunnel, or received from a configuration server, among others.

While the other machines in the grid may not initially know about the configuration of the grid, that information may also be sent to each other node by the primary control node. Updates of the grid information may also be subsequently sent to those nodes.

For any control node other than the primary control node added to the grid, the control node may open three sockets. The first socket may accept work requests from clients, the second socket may accept connections from other grid members, and the third socket may connect (e.g., permanently) to the primary control node. When a control node (e.g., primary control node) receives a connection from another control node, it first checks to see if the peer node is in the list of configured nodes in the grid. If it is not on the list, the control node may clear the connection. If it is on the list, it may then attempt to authenticate the connection. If authentication is successful, the authenticating node may transmit information to its peer, such as the port number on which a node is listening for connections, the host name of the node, and information about how to authenticate the node, among other information. When a node, such as the new control node, receives information about another active node, it will check to see if it already has a connection to that other node. If it does not have a connection to that node, it may then establish a connection to that control node.

Any worker node added to the grid may establish a connection to the primary control node and any other control nodes on the grid. After establishing the connection, it may authenticate itself to the grid (e.g., any control nodes, including both primary and backup, or a server or user controlling the grid). After successful authentication, the worker node may accept configuration information from the control node.

When a node joins a communications grid (e.g., when the node is powered on or connected to an existing node on the grid or both), the node is assigned (e.g., by an operating system of the grid) a universally unique identifier (UUID). This unique identifier may help other nodes and external entities (devices, users, etc.) to identify the node and distinguish it from other nodes. When a node is connected to the grid, the node may share its unique identifier with the other nodes in the grid. Since each node may share its unique identifier, each node may know the unique identifier of every other node on the grid. Unique identifiers may also designate a hierarchy of each of the nodes (e.g., backup control nodes) within the grid. For example, the unique identifiers of each of the backup control nodes may be stored in a list of backup control nodes to indicate an order in which the backup control nodes will take over for a failed primary control node to become a new primary control node. However, a hierarchy of nodes may also be determined using methods other than using the unique identifiers of the nodes. For example, the hierarchy may be predetermined, or may be assigned based on other predetermined factors.

The grid may add new machines at any time (e.g., initiated from any control node). Upon adding a new node to the grid, the control node may first add the new node to its table of grid nodes. The control node may also then notify every other control node about the new node. The nodes receiving the notification may acknowledge that they have updated their configuration information.

Primary control node 402 may, for example, transmit one or more communications to backup control nodes 404 and 406 (and, for example, to other control or worker nodes within the communications grid). Such communications may be sent periodically, at fixed time intervals, between known fixed stages of the project's execution, among other protocols. The communications transmitted by primary control node 402 may be of varied types and may include a variety of types of information. For example, primary control node 402 may transmit snapshots (e.g., status information) of the communications grid so that backup control node 404 always has a recent snapshot of the communications grid. The snapshot or grid status may include, for example, the structure of the grid (including, for example, the worker nodes in the grid, unique identifiers of the nodes, or their relationships with the primary control node) and the status of a project (including, for example, the status of each worker node's portion of the project). The snapshot may also include analysis or results received from worker nodes in the communications grid. The backup control nodes may receive and store the backup data received from the primary control node. The backup control nodes may transmit a request for such a snapshot (or other information) from the primary control node, or the primary control node may send such information periodically to the backup control nodes.

As noted, the backup data may allow the backup control node to take over as primary control node if the primary control node fails without requiring the grid to start the project over from scratch. If the primary control node fails, the backup control node that will take over as primary control node may retrieve the most recent version of the snapshot received from the primary control node and use the snapshot to continue the project from the stage of the project indicated by the backup data. This may prevent failure of the project as a whole.

A backup control node may use various methods to determine that the primary control node has failed. In one example of such a method, the primary control node may transmit (e.g., periodically) a communication to the backup control node that indicates that the primary control node is working and has not failed, such as a heartbeat communication. The backup control node may determine that the primary control node has failed if the backup control node has not received a heartbeat communication for a certain predetermined period of time. Alternatively, a backup control node may also receive a communication from the primary control node itself (before it failed) or from a worker node that the primary control node has failed, for example because the primary control node has failed to communicate with the worker node.

Different methods may be performed to determine which backup control node of a set of backup control nodes (e.g., backup control nodes 404 and 406) will take over for failed primary control node 402 and become the new primary control node. For example, the new primary control node may be chosen based on a ranking or "hierarchy" of backup control nodes based on their unique identifiers. In an alternative embodiment, a backup control node may be assigned to be the new primary control node by another device in the communications grid or from an external device (e.g., a system infrastructure or an end user, such as a server or computer, controlling the communications grid). In another alternative embodiment, the backup control node that takes over as the new primary control node may be designated based on bandwidth or other statistics about the communications grid.

A worker node within the communications grid may also fail. If a worker node fails, work being performed by the failed worker node may be redistributed amongst the operational worker nodes. In an alternative embodiment, the primary control node may transmit a communication to each of the operable worker nodes still on the communications grid that each of the worker nodes should purposefully fail also. After each of the worker nodes fail, they may each retrieve their most recent saved checkpoint of their status and re-start the project from that checkpoint to minimize lost progress on the project being executed.

Figure 5:
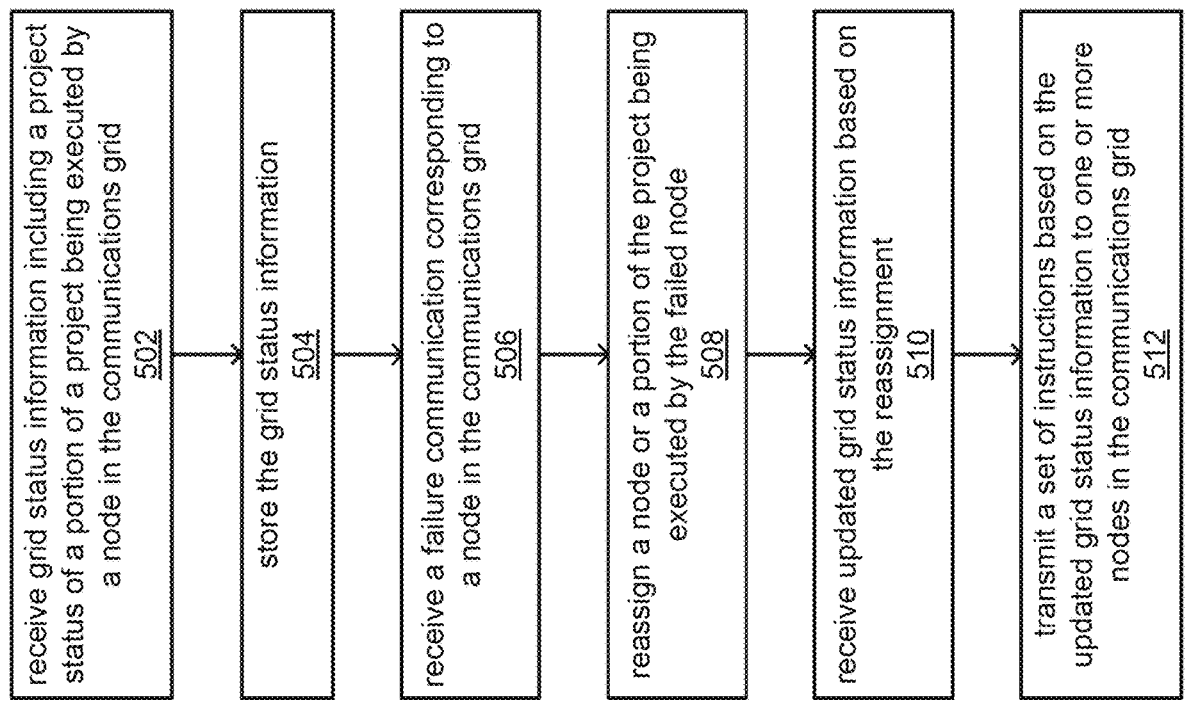
FIG. 5 shows a flow chart showing an example process for adjusting a communications grid or a work project in a communications grid after a failure of a node according to some aspects of the present disclosure.

FIG. 5 illustrates a flow chart showing an example process 500 for adjusting a communications grid or a work project in a communications grid after a failure of a node, according to embodiments of the present technology. The process may include, for example, receiving grid status information including a project status of a portion of a project being executed by a node in the communications grid, as described in operation 502. For example, a control node (e.g., a backup control node connected to a primary control node and a worker node on a communications grid) may receive grid status information, where the grid status information includes a project status of the primary control node or a project status of the worker node. The project status of the primary control node and the project status of the worker node may include a status of one or more portions of a project being executed by the primary and worker nodes in the communications grid. The process may also include storing the grid status information, as described in operation 504. For example, a control node (e.g., a backup control node) may store the received grid status information locally within the control node. Alternatively, the grid status information may be sent to another device for storage where the control node may have access to the information.

The process may also include receiving a failure communication corresponding to a node in the communications grid in operation 506. For example, a node may receive a failure communication including an indication that the primary control node has failed, prompting a backup control node to take over for the primary control node. In an alternative embodiment, a node may receive a failure that a worker node has failed, prompting a control node to reassign the work being performed by the worker node. The process may also include reassigning a node or a portion of the project being executed by the failed node, as described in operation 508. For example, a control node may designate the backup control node as a new primary control node based on the failure communication upon receiving the failure communication. If the failed node is a worker node, a control node may identify a project status of the failed worker node using the snapshot of the communications grid, where the project status of the failed worker node includes a status of a portion of the project being executed by the failed worker node at the failure time.

The process may also include receiving updated grid status information based on the reassignment, as described in operation 510, and transmitting a set of instructions based on the updated grid status information to one or more nodes in the communications grid, as described in operation 512. The updated grid status information may include an updated project status of the primary control node or an updated project status of the worker node. The updated information may be transmitted to the other nodes in the grid to update their stale stored information.

Figure 6:
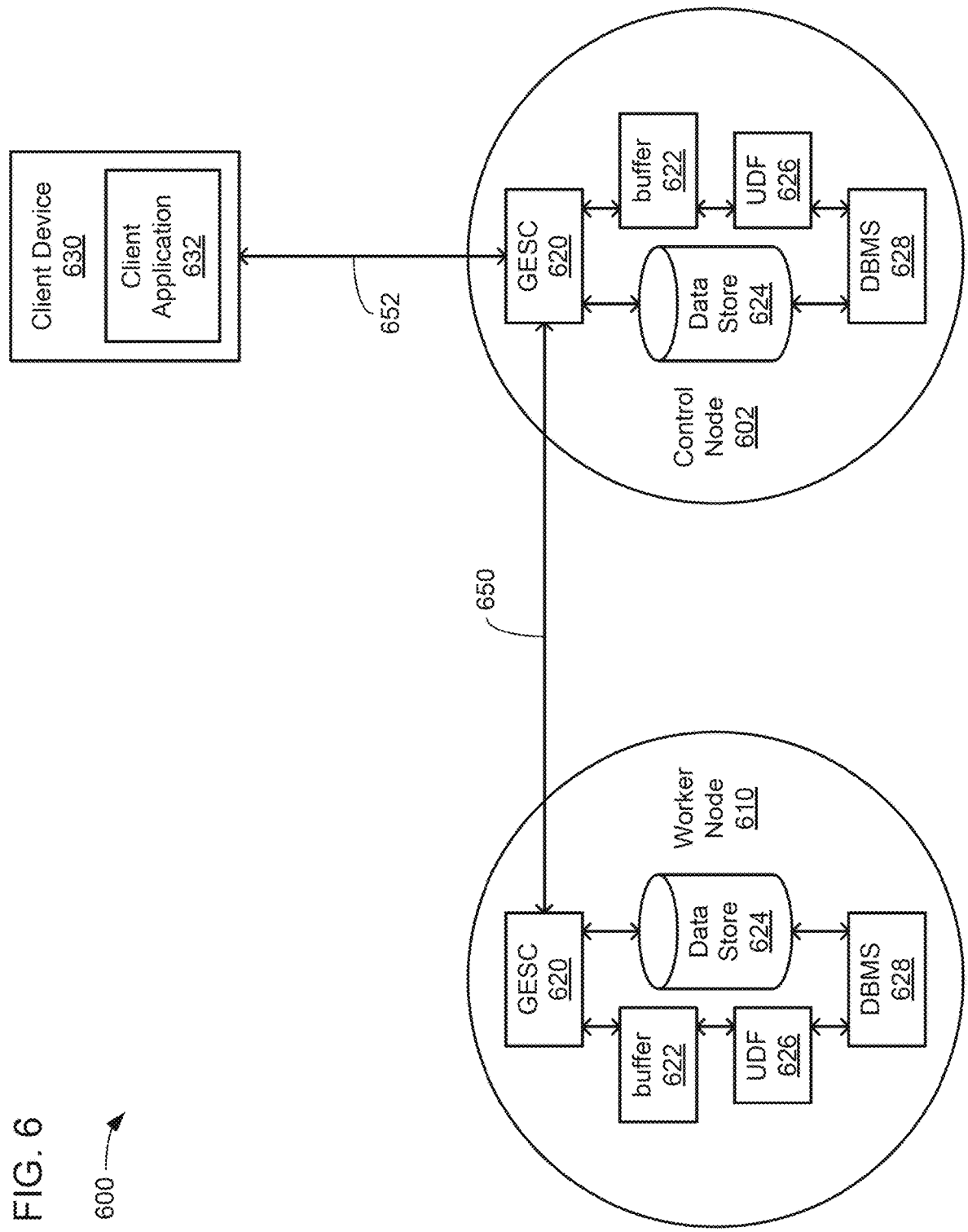
FIG. 6 shows a portion of a communications grid computing system including a control node and a worker node according to some aspects of the present disclosure.

FIG. 6 illustrates a portion of a communications grid computing system 600 including a control node and a worker node, according to embodiments of the present technology. Communications grid computing system 600 includes one control node (control node 602) and one worker node (worker node 610) for purposes of illustration, but may include more worker and/or control nodes. The control node 602 is communicatively connected to worker node 610 via communication path 650. Therefore, control node 602 may transmit information (e.g., related to the communications grid or notifications), to and receive information from worker node 610 via path 650.

Similar to in FIG. 4, communications grid computing system (or just "communications grid") 600 includes data processing nodes (control node 602 and worker node 610). Nodes 602 and 610 include multi-core data processors. Each node 602 and 610 includes a grid-enabled software component (GESC) 620 that executes on the data processor associated with that node and interfaces with buffer memory 622 also associated with that node. Each node 602 and 610 includes database management software (DBMS) 628 that executes on a database server (not shown) at control node 602 and on a database server (not shown) at worker node 610.

Each node also includes a data store 624. Data stores 624, similar to network-attached data stores 110 in FIG. 1 and data stores 235 in FIG. 2, are used to store data to be processed by the nodes in the computing environment. Data stores 624 may also store any intermediate or final data generated by the computing system after being processed, for example in non-volatile memory. However in certain embodiments, the configuration of the grid computing environment allows its operations to be performed such that intermediate and final data results can be stored solely in volatile memory (e.g., RAM), without a requirement that intermediate or final data results be stored to non-volatile types of memory. Storing such data in volatile memory may be useful in certain situations, such as when the grid receives queries (e.g., ad hoc) from a client and when responses, which are generated by processing large amounts of data, need to be generated quickly or on-the-fly. In such a situation, the grid may be configured to retain the data within memory so that responses can be generated at different levels of detail and so that a client may interactively query against this information.

Each node also includes a user-defined function (UDF) 626. The UDF provides a mechanism for the DBMS 628 to transfer data to or receive data from the database stored in the data stores 624 that are managed by the DBMS 628. For example, UDF 626 can be invoked by the DBMS 628 to provide data to the GESC 620 for processing. The UDF 626 may establish a socket connection (not shown) with the GESC 620 to transfer the data. Alternatively, the UDF 626 can transfer data to the GESC 620 by writing data to shared memory accessible by both the UDF 626 and the GESC 620.

The GESC 620 at the nodes 602 and 610 may be connected via a network, such as network 108 shown in FIG. 1. Therefore, nodes 602 and 610 can communicate with each other via the network using a predetermined communication protocol such as, for example, the Message Passing Interface (MPI). Each GESC 620 can engage in point-to-point communication with the GESC at another node or in collective communication with multiple GESCs via the network. The GESC 620 at each node may contain identical (or nearly identical) software instructions. Each node may be capable of operating as either a control node or a worker node. The GESC at the control node 602 can communicate, over a communication path 652, with a client device 630. More specifically, control node 602 may communicate with client application 632 hosted by the client device 630 to receive queries and to respond to those queries after processing large amounts of data.

DBMS 628 may control the creation, maintenance, and use of database or data structure (not shown) within a nodes 602 or 610. The database may organize data stored in data stores 624. The DBMS 628 at control node 602 may accept requests for data and transfer the appropriate data for the request. With such a process, collections of data may be distributed across multiple physical locations. In this example, each node 602 and 610 stores a portion of the total data managed by the management system in its associated data store 624.

Furthermore, the DBMS may be responsible for protecting against data loss using replication techniques. Replication includes providing a backup copy of data stored on one node on one or more other nodes. Therefore, if one node fails, the data from the failed node can be recovered from a replicated copy residing at another node. However, as described herein with respect to FIG. 4, data or status information for each node in the communications grid may also be shared with each node on the grid.

Figure 7:
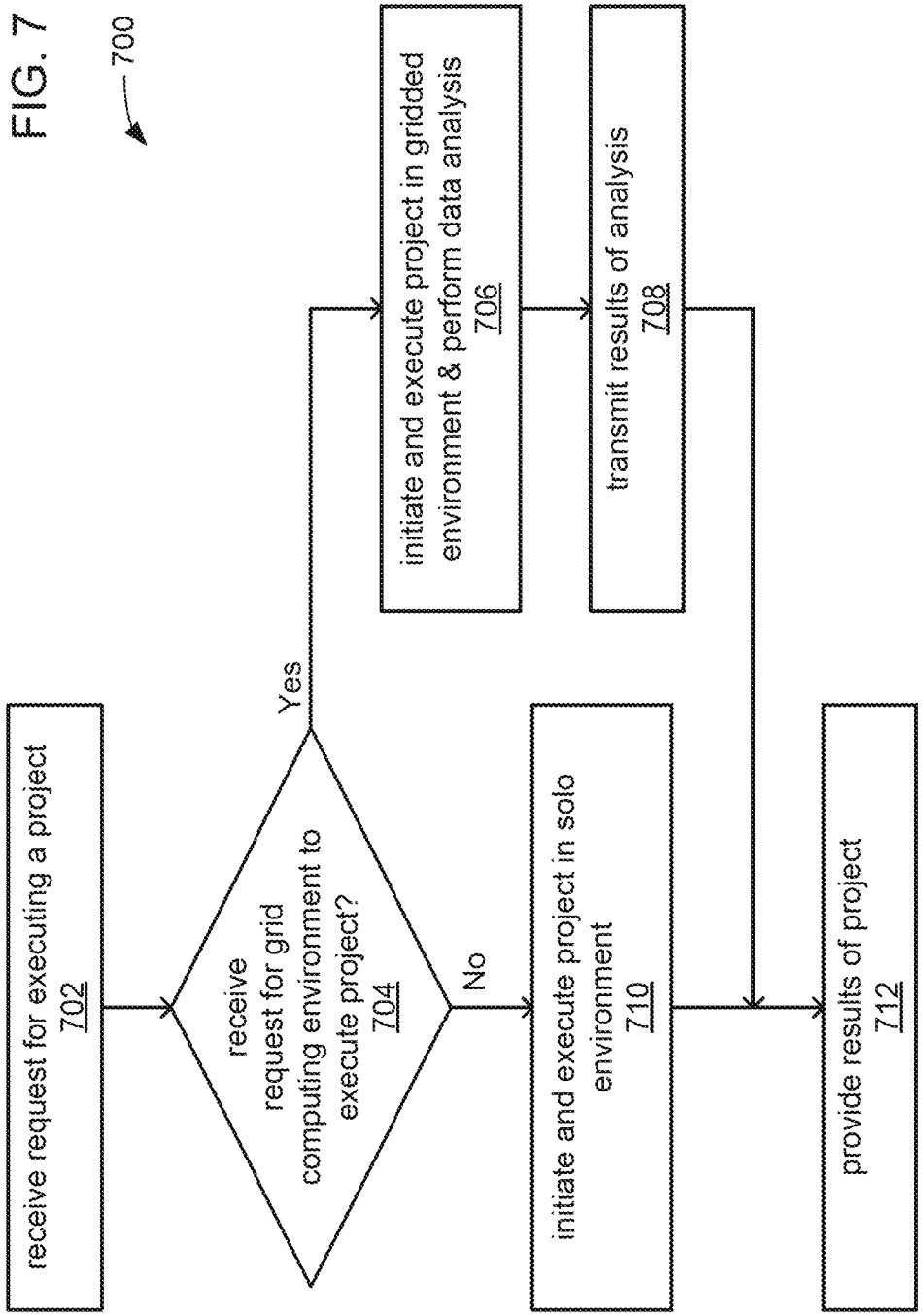
FIG. 7 shows a flow chart showing an example method 700 for executing a project within a grid computing system according to some aspects of the present disclosure.

FIG. 7 illustrates a flow chart showing an example method 700 for executing a project within a grid computing system, according to embodiments of the present technology. As described with respect to FIG. 6, the GESC at the control node may transmit data with a client device (e.g., client device 630) to receive queries for executing a project and to respond to those queries after large amounts of data have been processed. The query may be transmitted to the control node, where the query may include a request for executing a project, as described in operation 702. The query can contain instructions on the type of data analysis to be performed in the project and whether the project should be executed using the grid-based computing environment, as shown in operation 704.

To initiate the project, the control node may determine if the query requests use of the grid-based computing environment to execute the project. If the determination is no, then the control node initiates execution of the project in a solo environment (e.g., at the control node), as described in operation 710. If the determination is yes, the control node may initiate execution of the project in the grid-based computing environment, as described in operation 706. In such a situation, the request may include a requested configuration of the grid. For example, the request may include a number of control nodes and a number of worker nodes to be used in the grid when executing the project. After the project has been completed, the control node may transmit results of the analysis yielded by the grid, as described in operation 708. Whether the project is executed in a solo or grid-based environment, the control node provides the results of the project, as described in operation 712.

As noted with respect to FIG. 2, the computing environments described herein may collect data (e.g., as received from network devices, such as sensors, such as network devices 204-209 in FIG. 2, and client devices or other sources) to be processed as part of a data analytics project, and data may be received in real time as part of a streaming analytics environment (e.g., ESP). Data may be collected using a variety of sources as communicated via different kinds of networks or locally, such as on a real-time streaming basis. For example, network devices may receive data periodically from network device sensors as the sensors continuously sense, monitor and track changes in their environments. More specifically, an increasing number of distributed applications develop or produce continuously flowing data from distributed sources by applying queries to the data before distributing the data to geographically distributed recipients. An event stream processing engine (ESPE) may continuously apply the queries to the data as it is received and determines which entities should receive the data. Client or other devices may also subscribe to the ESPE or other devices processing ESP data so that they can receive data after processing, based on for example the entities determined by the processing engine. For example, client devices 230 in FIG. 2 may subscribe to the ESPE in computing environment 214. In another example, event subscription devices 1024a-c, described further with respect to FIG. 10, may also subscribe to the ESPE. The ESPE may determine or define how input data or event streams from network devices or other publishers (e.g., network devices 204-209 in FIG. 2) are transformed into meaningful output data to be consumed by subscribers, such as for example client devices 230 in FIG. 2.

FIG. 8 illustrates a block diagram including components of an Event Stream Processing Engine (ESPE), according to embodiments of the present technology. ESPE 800 may include one or more projects 802. A project may be described as a second-level container in an engine model managed by ESPE 800 where a thread pool size for the project may be defined by a user. Each project of the one or more projects 802 may include one or more continuous queries 804 that contain data flows, which are data transformations of incoming event streams. The one or more continuous queries 804 may include one or more source windows 806 and one or more derived windows 808.

The ESPE may receive streaming data over a period of time related to certain events, such as events or other data sensed by one or more network devices. The ESPE may perform operations associated with processing data created by the one or more devices. For example, the ESPE may receive data from the one or more network devices 204-209 shown in FIG. 2. As noted, the network devices may include sensors that sense different aspects of their environments, and may collect data over time based on those sensed observations. For example, the ESPE may be implemented within one or more of machines 220 and 240 shown in FIG. 2. The ESPE may be implemented within such a machine by an ESP application. An ESP application may embed an ESPE with its own dedicated thread pool or pools into its application space where the main application thread can do application-specific work and the ESPE processes event streams at least by creating an instance of a model into processing objects.

The engine container is the top-level container in a model that manages the resources of the one or more projects 802. In an illustrative embodiment, for example, there may be only one ESPE 800 for each instance of the ESP application, and ESPE 800 may have a unique engine name. Additionally, the one or more projects 802 may each have unique project names, and each query may have a unique continuous query name and begin with a uniquely named source window of the one or more source windows 806. ESPE 800 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 806 and the one or more derived windows 808 represent continuously executing queries that generate updates to a query result set as new event blocks stream through ESPE 800. A directed graph, for example, is a set of nodes connected by edges, where the edges have a direction associated with them.

An event object may be described as a packet of data accessible as a collection of fields, with at least one of the fields defined as a key or unique identifier (ID). The event object may be created using a variety of formats including binary, alphanumeric, XML, etc. Each event object may include one or more fields designated as a primary identifier (ID) for the event so ESPE 800 can support operation codes (opcodes) for events including insert, update, upsert, and delete. Upsert opcodes update the event if the key field already exists; otherwise, the event is inserted. For illustration, an event object may be a packed binary representation of a set of field values and include both metadata and field data associated with an event. The metadata may include an opcode indicating if the event represents an insert, update, delete, or upsert, a set of flags indicating if the event is a normal, partial-update, or a retention generated event from retention policy management, and a set of microsecond timestamps that can be used for latency measurements.

An event block object may be described as a grouping or package of event objects. An event stream may be described as a flow of event block objects. A continuous query of the one or more continuous queries 804 transforms a source event stream made up of streaming event block objects published into ESPE 800 into one or more output event streams using the one or more source windows 806 and the one or more derived windows 808. A continuous query can also be thought of as data flow modeling.

The one or more source windows 806 are at the top of the directed graph and have no windows feeding into them. Event streams are published into the one or more source windows 806, and from there, the event streams may be directed to the next set of connected windows as defined by the directed graph. The one or more derived windows 808 are all instantiated windows that are not source windows and that have other windows streaming events into them. The one or more derived windows 808 may perform computations or transformations on the incoming event streams. The one or more derived windows 808 transform event streams based on the window type (that is operators such as join, filter, compute, aggregate, copy, pattern match, procedural, union, etc.) and window settings. As event streams are published into ESPE 800, they are continuously queried, and the resulting sets of derived windows in these queries are continuously updated.

FIG. 9 illustrates a flow chart showing an example process including operations performed by an event stream processing engine, according to some embodiments of the present technology. As noted, the ESPE 800 (or an associated ESP application) defines how input event streams are transformed into meaningful output event streams. More specifically, the ESP application may define how input event streams from publishers (e.g., network devices providing sensed data) are transformed into meaningful output event streams consumed by subscribers (e.g., a data analytics project being executed by a machine or set of machines).

Within the application, a user may interact with one or more user interface windows presented to the user in a display under control of the ESPE independently or through a browser application in an order selectable by the user. For example, a user may execute an ESP application, which causes presentation of a first user interface window, which may include a plurality of menus and selectors such as drop down menus, buttons, text boxes, hyperlinks, etc. associated with the ESP application as understood by a person of skill in the art. As further understood by a person of skill in the art, various operations may be performed in parallel, for example, using a plurality of threads.

At operation 900, an ESP application may define and start an ESPE, thereby instantiating an ESPE at a device, such as machine 220 and/or 240. In an operation 902, the engine container is created. For illustration, ESPE 800 may be instantiated using a function call that specifies the engine container as a manager for the model.

In an operation 904, the one or more continuous queries 804 are instantiated by ESPE 800 as a model. The one or more continuous queries 804 may be instantiated with a dedicated thread pool or pools that generate updates as new events stream through ESPE 800. For illustration, the one or more continuous queries 804 may be created to model business processing logic within ESPE 800, to predict events within ESPE 800, to model a physical system within ESPE 800, to predict the physical system state within ESPE 800, etc. For example, as noted, ESPE 800 may be used to support sensor data monitoring and management (e.g., sensing may include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, or electrical current, etc.).

ESPE 800 may analyze and process events in motion or "event streams." Instead of storing data and running queries against the stored data, ESPE 800 may store queries and stream data through them to allow continuous analysis of data as it is received. The one or more source windows 806 and the one or more derived windows 808 may be created based on the relational, pattern matching, and procedural algorithms that transform the input event streams into the output event streams to model, simulate, score, test, predict, etc. based on the continuous query model defined and application to the streamed data.

In an operation 906, a publish/subscribe (pub/sub) capability is initialized for ESPE 800. In an illustrative embodiment, a pub/sub capability is initialized for each project of the one or more projects 802. To initialize and enable pub/sub capability for ESPE 800, a port number may be provided. Pub/sub clients can use a host name of an ESP device running the ESPE and the port number to establish pub/sub connections to ESPE 800.

FIG. 10 illustrates an ESP system 1000 interfacing between publishing device 1022 and event subscribing devices 1024*a-c*, according to embodiments of the present technology. ESP system 1000 may include ESP device or subsystem 1001, event publishing device 1022, an event subscribing device A 1024*a*, an event subscribing device B 1024*b*, and an event subscribing device C 1024*c*. Input event streams are output to ESP subsystem 1001 by publishing device 1022. In alternative embodiments, the input event streams may be created by a plurality of publishing devices. The plurality of publishing devices further may publish event streams to other ESP devices. The one or more continuous queries instantiated by ESPE 800 may analyze and process the input event streams to form output event streams output to event subscribing device A 1024*a*, event subscribing device B 1024*b*, and event subscribing device C 1024*c*. ESP system 1000 may include a greater or a fewer number of event subscribing devices of event subscribing devices.

Publish-subscribe is a message-oriented interaction paradigm based on indirect addressing. Processed data recipients specify their interest in receiving information from ESPE 800 by subscribing to specific classes of events, while information sources publish events to ESPE 800 without directly addressing the receiving parties. ESPE 800 coordinates the interactions and processes the data. In some cases, the data source receives confirmation that the published information has been received by a data recipient.

A publish/subscribe API may be described as a library that enables an event publisher, such as publishing device 1022, to publish event streams into ESPE 800 or an event subscriber, such as event subscribing device A 1024*a*, event subscribing device B 1024*b*, and event subscribing device C 1024*c*, to subscribe to event streams from ESPE 800. For illustration, one or more publish/subscribe APIs may be defined. Using the publish/subscribe API, an event publishing application may publish event streams into a running event stream processor project source window of ESPE 800, and the event subscription application may subscribe to an event stream processor project source window of ESPE 800.

The publish/subscribe API provides cross-platform connectivity and endianness compatibility between ESP application and other networked applications, such as event publishing applications instantiated at publishing device 1022, and event subscription applications instantiated at one or more of event subscribing device A 1024*a*, event subscribing device B 1024*b*, and event subscribing device C 1024*c*.

Referring back to FIG. 9, operation 906 initializes the publish/subscribe capability of ESPE 800. In an operation 908, the one or more projects 802 are started. The one or more started projects may run in the background on an ESP device. In an operation 910, an event block object is received from one or more computing device of the event publishing device 1022.

ESP subsystem 1001 may include a publishing client 1002, ESPE 800, a subscribing client A 1004, a subscribing client B 1006, and a subscribing client C 1008. Publishing client 1002 may be started by an event publishing application executing at publishing device 1022 using the publish/subscribe API. Subscribing client A 1004 may be started by an event subscription application A, executing at event subscribing device A 1024*a* using the publish/subscribe API. Subscribing client B 1006 may be started by an event subscription application B executing at event subscribing device B 1024*b* using the publish/subscribe API. Subscribing client C 1008 may be started by an event subscription application C executing at event subscribing device C 1024*c* using the publish/subscribe API.

An event block object containing one or more event objects is injected into a source window of the one or more source windows 806 from an instance of an event publishing application on event publishing device 1022. The event block object may be generated, for example, by the event publishing application and may be received by publishing client 1002. A unique ID may be maintained as the event block object is passed between the one or more source windows 806 and/or the one or more derived windows 808 of ESPE 800, and to subscribing client A 1004, subscribing client B 1006, and subscribing client C 1008 and to event subscription device A 1024*a*, event subscription device B 1024*b*, and event subscription device C 1024*c*. Publishing client 1002 may further generate and include a unique embedded transaction ID in the event block object as the event block object is processed by a continuous query, as well as the unique ID that publishing device 1022 assigned to the event block object.

In an operation 912, the event block object is processed through the one or more continuous queries 804. In an operation 914, the processed event block object is output to one or more computing devices of the event subscribing devices 1024*a-c*. For example, subscribing client A 1004, subscribing client B 1006, and subscribing client C 1008 may send the received event block object to event subscription device A 1024*a*, event subscription device B 1024*b*, and event subscription device C 1024*c*, respectively.

ESPE 800 maintains the event block containership aspect of the received event blocks from when the event block is published into a source window and works its way through the directed graph defined by the one or more continuous queries 804 with the various event translations before being output to subscribers. Subscribers can correlate a group of subscribed events back to a group of published events by comparing the unique ID of the event block object that a publisher, such as publishing device 1022, attached to the event block object with the event block ID received by the subscriber.

In an operation 916, a determination is made concerning whether or not processing is stopped. If processing is not stopped, processing continues in operation 910 to continue receiving the one or more event streams containing event block objects from the, for example, one or more network devices. If processing is stopped, processing continues in an operation 918. In operation 918, the started projects are stopped. In operation 920, the ESPE is shutdown.

As noted, in some embodiments, big data is processed for an analytics project after the data is received and stored. In other embodiments, distributed applications process continuously flowing data in real-time from distributed sources by applying queries to the data before distributing the data to geographically distributed recipients. As noted, an event stream processing engine (ESPE) may continuously apply the queries to the data as it is received and determines which entities receive the processed data. This allows for large amounts of data being received and/or collected in a variety of environments to be processed and distributed in real time. For example, as shown with respect to FIG. 2, data may be collected from network devices that may include devices within the internet of things, such as devices within a home automation network. However, such data may be collected from a variety of different resources in a variety of different environments. In any such situation, embodiments of the present technology allow for real-time processing of such data.

Aspects of the current disclosure provide technical solutions to technical problems, such as computing problems that arise when an ESP device fails which results in a complete service interruption and potentially significant data loss. The data loss can be catastrophic when the streamed data is supporting mission critical operations such as those in support of an ongoing manufacturing or drilling operation. An embodiment of an ESP system achieves a rapid and seamless failover of ESPE running at the plurality of ESP devices without service interruption or data loss, thus significantly improving the reliability of an operational system that relies on the live or real-time processing of the data streams. The event publishing systems, the event subscribing systems, and each ESPE not executing at a failed ESP device are not aware of or effected by the failed ESP device. The ESP system may include thousands of event publishing systems and event subscribing systems. The ESP system keeps the failover logic and awareness within the boundaries of out-messaging network connector and out-messaging network device.

In one example embodiment, a system is provided to support a failover when event stream processing (ESP) event blocks. The system includes, but is not limited to, an out-messaging network device and a computing device. The computing device includes, but is not limited to, a processor and a computer-readable medium operably coupled to the processor. The processor is configured to execute an ESP engine (ESPE). The computer-readable medium has instructions stored thereon that, when executed by the processor, cause the computing device to support the failover. An event block object is received from the ESPE that includes a unique identifier. A first status of the computing device as active or standby is determined. When the first status is active, a second status of the computing device as newly active or not newly active is determined. Newly active is determined when the computing device is switched from a standby status to an active status. When the second status is newly active, a last published event block object identifier that uniquely identifies a last published event block object is determined. A next event block object is selected from a non-transitory computer-readable medium accessible by the computing device. The next event block object has an event block object identifier that is greater than the determined last published event block object identifier. The selected next event block object is published to an out-messaging network device. When the second status of the computing device is not newly active, the received event block object is published to the out-messaging network device. When the first status of the computing device is standby, the received event block object is stored in the non-transitory computer-readable medium.

Figure 11:
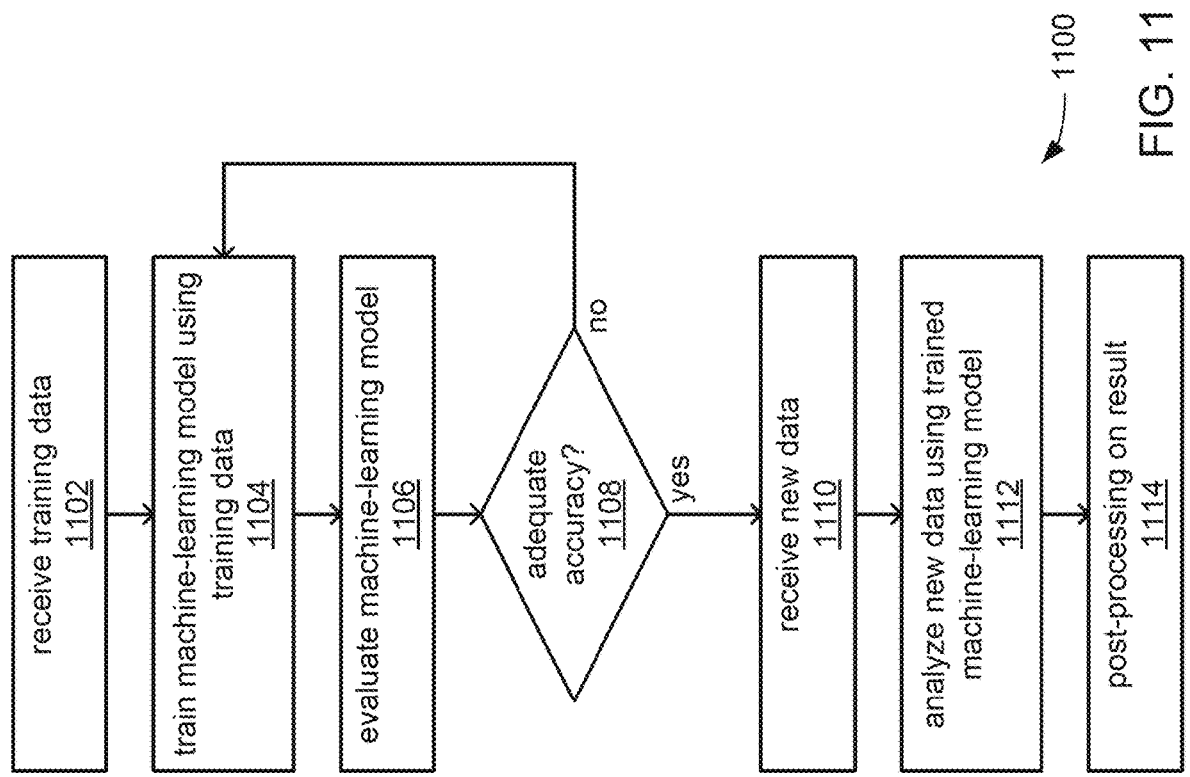
FIG. 11 shows a flow chart of an example of a process for generating and using a machine-learning model according to some aspects of the present disclosure.

FIG. 11 is a flow chart of an example of a process for generating and using a machine-learning model according to some aspects. Machine learning is a branch of artificial intelligence that relates to mathematical models that can learn from, categorize, and make predictions about data. Such mathematical models, which can be referred to as machine-learning models, can classify input data among two or more classes; cluster input data among two or more groups; predict a result based on input data; identify patterns or trends in input data; identify a distribution of input data in a space; or any combination of these. Examples of machine-learning models can include (i) neural networks; (ii) decision trees, such as classification trees and regression trees; (iii) classifiers, such as Naïve bias classifiers, logistic regression classifiers, ridge regression classifiers, random forest classifiers, least absolute shrinkage and selector (LASSO) classifiers, and support vector machines; (iv) clusterers, such as k-means clusterers, mean-shift clusterers, and spectral clusterers; (v) factorizers, such as factorization machines, principal component analyzers and kernel principal component analyzers; and (vi) ensembles or other combinations of machine-learning models. In some examples, neural networks can include deep neural networks, feed-forward neural networks, recurrent neural networks, convolutional neural networks, radial basis function (RBF) neural networks, echo state neural networks, long short-term memory neural networks, bi-directional recurrent neural networks, gated neural networks, hierarchical recurrent neural networks, stochastic neural networks, modular neural networks, spiking neural networks, dynamic neural networks, cascading neural networks, neuro-fuzzy neural networks, or any combination of these.

Different machine-learning models may be used interchangeably to perform a task. Examples of tasks that can be performed at least partially using machine-learning models include various types of scoring; bioinformatics; cheminformatics; software engineering; fraud detection; customer segmentation; generating online recommendations; adaptive websites; determining customer lifetime value; search engines; placing advertisements in real time or near real time; classifying DNA sequences; affective computing; performing natural language processing and understanding; object recognition and computer vision; robotic locomotion;

playing games; optimization and metaheuristics; detecting network intrusions; medical diagnosis and monitoring; or predicting when an asset, such as a machine, will need maintenance.

Any number and combination of tools can be used to create machine-learning models. Examples of tools for creating and managing machine-learning models can include SAS® Enterprise Miner, SAS® Rapid Predictive Modeler, and SAS® Model Manager, SAS Cloud Analytic Services (CAS)®, SAS Viya® of all which are by SAS Institute Inc. of Cary, N.C.

Machine-learning models can be constructed through an at least partially automated (e.g., with little or no human involvement) process called training. During training, input data can be iteratively supplied to a machine-learning model to enable the machine-learning model to identify patterns related to the input data or to identify relationships between the input data and output data. With training, the machine-learning model can be transformed from an untrained state to a trained state. Input data can be split into one or more training sets and one or more validation sets, and the training process may be repeated multiple times. The splitting may follow a k-fold cross-validation rule, a leave-one-out-rule, a leave-p-out rule, or a holdout rule. An overview of training and using a machine-learning model is described below with respect to the flow chart of FIG. 11.

In block 1102, training data is received. In some examples, the training data is received from a remote database or a local database, constructed from various subsets of data, or input by a user. The training data can be used in its raw form for training a machine-learning model or pre-processed into another form, which can then be used for training the machine-learning model. For example, the raw form of the training data can be smoothed, truncated, aggregated, clustered, or otherwise manipulated into another form, which can then be used for training the machine-learning model.

In block 1104, a machine-learning model is trained using the training data. The machine-learning model can be trained in a supervised, unsupervised, or semi-supervised manner. In supervised training, each input in the training data is correlated to a desired output. This desired output may be a scalar, a vector, or a different type of data structure such as text or an image. This may enable the machine-learning model to learn a mapping between the inputs and desired outputs. In unsupervised training, the training data includes inputs, but not desired outputs, so that the machine-learning model has to find structure in the inputs on its own. In semi-supervised training, only some of the inputs in the training data are correlated to desired outputs.

In block 1106, the machine-learning model is evaluated. For example, an evaluation dataset can be obtained, for example, via user input or from a database. The evaluation dataset can include inputs correlated to desired outputs. The inputs can be provided to the machine-learning model and the outputs from the machine-learning model can be compared to the desired outputs. If the outputs from the machine-learning model closely correspond with the desired outputs, the machine-learning model may have a high degree of accuracy. For example, if 90% or more of the outputs from the machine-learning model are the same as the desired outputs in the evaluation dataset, the machine-learning model may have a high degree of accuracy. Otherwise, the machine-learning model may have a low degree of accuracy. The 90% number is an example only. A realistic and desirable accuracy percentage is dependent on the problem and the data.

In some examples, if, at block 1108, the machine-learning model has an inadequate degree of accuracy for a particular task, the process can return to block 1104, where the machine-learning model can be further trained using additional training data or otherwise modified to improve accuracy. However, if, at block 1108, the machine-learning model has an adequate degree of accuracy for the particular task, the process can continue to block 1110.

In block 1110, new data is received. In some examples, the new data is received from a remote database or a local database, constructed from various subsets of data, or input by a user. The new data may be unknown to the machine-learning model. For example, the machine-learning model may not have previously processed or analyzed the new data.

In block 1112, the trained machine-learning model is used to analyze the new data and provide a result. For example, the new data can be provided as input to the trained machine-learning model. The trained machine-learning model can analyze the new data and provide a result that includes a classification of the new data into a particular class, a clustering of the new data into a particular group, a prediction based on the new data, or any combination of these.

In block 1114, the result is post-processed. For example, the result can be added to, multiplied with, or otherwise combined with other data as part of a job. As another example, the result can be transformed from a first format, such as a time series format, into another format, such as a count series format. Any number and combination of operations can be performed on the result during post-processing.

Figure 12:
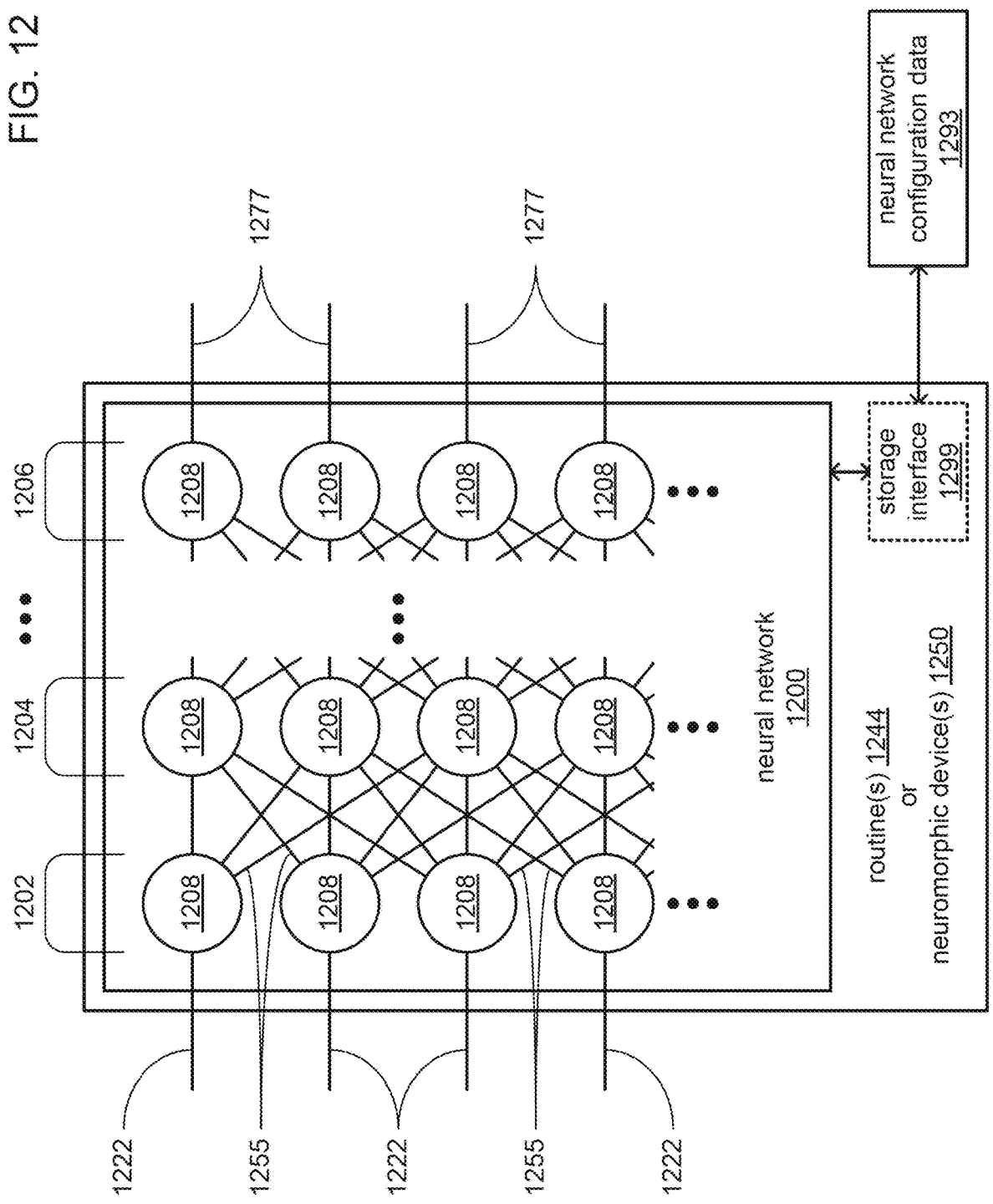
FIG. 12 shows a node-link diagram of an example of a neural network according to some aspects of the present disclosure.

A more specific example of a machine-learning model is the neural network 1200 shown in FIG. 12. The neural network 1200 is represented as multiple layers of neurons 1208 that can exchange data between one another via connections 1255 that may be selectively instantiated thereamong. The layers include an input layer 1202 for receiving input data provided at inputs 1222, one or more hidden layers 1204, and an output layer 1206 for providing a result at outputs 1277. The hidden layer(s) 1204 are referred to as hidden because they may not be directly observable or have their inputs or outputs directly accessible during the normal functioning of the neural network 1200. Although the neural network 1200 is shown as having a specific number of layers and neurons for exemplary purposes, the neural network 1200 can have any number and combination of layers, and each layer can have any number and combination of neurons.

The neurons 1208 and connections 1255 thereamong may have numeric weights, which can be tuned during training of the neural network 1200. For example, training data can be provided to at least the inputs 1222 to the input layer 1202 of the neural network 1200, and the neural network 1200 can use the training data to tune one or more numeric weights of the neural network 1200. In some examples, the neural network 1200 can be trained using backpropagation. Backpropagation can include determining a gradient of a particular numeric weight based on a difference between an actual output of the neural network 1200 at the outputs 1277 and a desired output of the neural network 1200. Based on the gradient, one or more numeric weights of the neural network 1200 can be updated to reduce the difference therebetween, thereby increasing the accuracy of the neural network 1200. This process can be repeated multiple times to train the neural network 1200. For example, this process can be repeated hundreds or thousands of times to train the neural network 1200.

In some examples, the neural network 1200 is a feed-forward neural network. In a feed-forward neural network, the connections 1255 are instantiated and/or weighted so that every neuron 1208 only propagates an output value to a subsequent layer of the neural network 1200. For example, data may only move one direction (forward) from one neuron 1208 to the next neuron 1208 in a feed-forward neural network. Such a "forward" direction may be defined as proceeding from the input layer 1202 through the one or more hidden layers 1204, and toward the output layer 1206.

In other examples, the neural network 1200 may be a recurrent neural network. A recurrent neural network can include one or more feedback loops among the connections 1255, thereby allowing data to propagate in both forward and backward through the neural network 1200. Such a "backward" direction may be defined as proceeding in the opposite direction of forward, such as from the output layer 1206 through the one or more hidden layers 1204, and toward the input layer 1202. This can allow for information to persist within the recurrent neural network. For example, a recurrent neural network can determine an output based at least partially on information that the recurrent neural network has seen before, giving the recurrent neural network the ability to use previous input to inform the output.

In some examples, the neural network 1200 operates by receiving a vector of numbers from one layer; transforming the vector of numbers into a new vector of numbers using a matrix of numeric weights, a nonlinearity, or both; and providing the new vector of numbers to a subsequent layer ("subsequent" in the sense of moving "forward") of the neural network 1200. Each subsequent layer of the neural network 1200 can repeat this process until the neural network 1200 outputs a final result at the outputs 1277 of the output layer 1206. For example, the neural network 1200 can receive a vector of numbers at the inputs 1222 of the input layer 1202. The neural network 1200 can multiply the vector of numbers by a matrix of numeric weights to determine a weighted vector. The matrix of numeric weights can be tuned during the training of the neural network 1200. The neural network 1200 can transform the weighted vector using a nonlinearity, such as a sigmoid tangent or the hyperbolic tangent. In some examples, the nonlinearity can include a rectified linear unit, which can be expressed using the equation $y=\max(x, 0)$ where y is the output and x is an input value from the weighted vector. The transformed output can be supplied to a subsequent layer (e.g., a hidden layer 1204) of the neural network 1200. The subsequent layer of the neural network 1200 can receive the transformed output, multiply the transformed output by a matrix of numeric weights and a nonlinearity, and provide the result to yet another layer of the neural network 1200 (e.g., another, subsequent, hidden layer 1204). This process continues until the neural network 1200 outputs a final result at the outputs 1277 of the output layer 1206.

As also depicted in FIG. 12, the neural network 1200 may be implemented either through the execution of the instructions of one or more routines 1244 by central processing units (CPUs), or through the use of one or more neuromorphic devices 1250 that incorporate a set of memristors (or other similar components) that each function to implement one of the neurons 1208 in hardware. Where multiple neuromorphic devices 1250 are used, they may be interconnected in a depth-wise manner to enable implementing neural networks with greater quantities of layers, and/or in a width-wise manner to enable implementing neural networks having greater quantities of neurons 1208 per layer.

The neuromorphic device 1250 may incorporate a storage interface 1299 by which neural network configuration data 1293 that is descriptive of various parameters and hyperparameters of the neural network 1200 may be stored and/or retrieved. More specifically, the neural network configuration data 1293 may include such parameters as weighting and/or biasing values derived through the training of the neural network 1200, as has been described. Alternatively or additionally, the neural network configuration data 1293 may include such hyperparameters as the manner in which the neurons 1208 are to be interconnected (e.g., feed-forward or recurrent), the trigger function to be implemented within the neurons 1208, the quantity of layers and/or the overall quantity of the neurons 1208. The neural network configuration data 1293 may provide such information for more than one neuromorphic device 1250 where multiple ones have been interconnected to support larger neural networks.

Other examples of the present disclosure may include any number and combination of machine-learning models having any number and combination of characteristics. The machine-learning model(s) can be trained in a supervised, semi-supervised, or unsupervised manner, or any combination of these. The machine-learning model(s) can be implemented using a single computing device or multiple computing devices, such as the communications grid computing system 400 discussed above.

Implementing some examples of the present disclosure at least in part by using machine-learning models can reduce the total number of processing iterations, time, memory, electrical power, or any combination of these consumed by a computing device when analyzing data. For example, a neural network may more readily identify patterns in data than other approaches. This may enable the neural network to analyze the data using fewer processing cycles and less memory than other approaches, while obtaining a similar or greater level of accuracy.

Some machine-learning approaches may be more efficiently and speedily executed and processed with machine-learning specific processors (e.g., not a generic CPU). Such processors may also provide an energy savings when compared to generic CPUs. For example, some of these processors can include a graphical processing unit (GPU), an application-specific integrated circuit (ASIC), a field-programmable gate array (FPGA), an artificial intelligence (AI) accelerator, a neural computing core, a neural computing engine, a neural processing unit, a purpose-built chip architecture for deep learning, and/or some other machine-learning specific processor that implements a machine learning approach or one or more neural networks using semiconductor (e.g., silicon (Si), gallium arsenide (GaAs)) devices. These processors may also be employed in heterogeneous computing architectures with a number of and/or a variety of different types of cores, engines, nodes, and/or layers to achieve various energy efficiencies, processing speed improvements, data communication speed improvements, and/or data efficiency targets and improvements throughout various parts of the system when compared to a homogeneous computing architecture that employs CPUs for general purpose computing.

Figure 13:
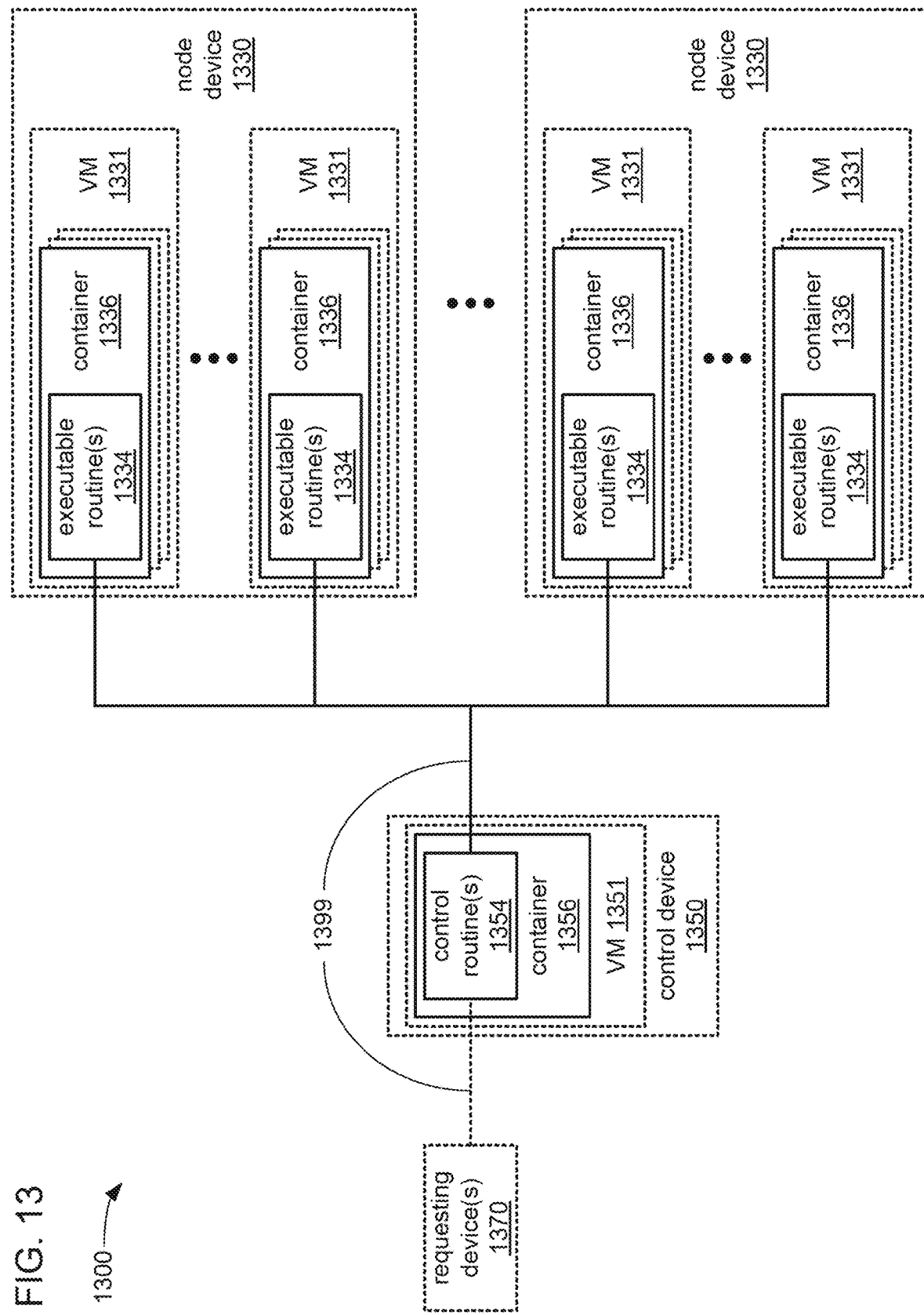
FIG. 13 shows various aspects of the use of containers as a mechanism to allocate processing, storage and/or other resources of a processing system to the performance of various analyses according to some aspects of the present disclosure.

FIG. 13 illustrates various aspects of the use of containers 1336 as a mechanism to allocate processing, storage and/or other resources of a processing system 1300 to the performance of various analyses. More specifically, in a processing system 1300 that includes one or more node devices 1330 (e.g., the aforementioned grid system 400), the processing, storage and/or other resources of each node device

1330 may be allocated through the instantiation and/or maintenance of multiple containers 1336 within the node devices 1330 to support the performance(s) of one or more analyses. As each container 1336 is instantiated, predetermined amounts of processing, storage and/or other resources may be allocated thereto as part of creating an execution environment therein in which one or more executable routines 1334 may be executed to cause the performance of part or all of each analysis that is requested to be performed.

It may be that at least a subset of the containers 1336 are each allocated a similar combination and amounts of resources so that each is of a similar configuration with a similar range of capabilities, and therefore, are interchangeable. This may be done in embodiments in which it is desired to have at least such a subset of the containers 1336 already instantiated prior to the receipt of requests to perform analyses, and thus, prior to the specific resource requirements of each of those analyses being known.

Alternatively or additionally, it may be that at least a subset of the containers 1336 are not instantiated until after the processing system 1300 receives requests to perform analyses where each request may include indications of the resources required for one of those analyses. Such information concerning resource requirements may then be used to guide the selection of resources and/or the amount of each resource allocated to each such container 1336. As a result, it may be that one or more of the containers 1336 are caused to have somewhat specialized configurations such that there may be differing types of containers to support the performance of different analyses and/or different portions of analyses.

It may be that the entirety of the logic of a requested analysis is implemented within a single executable routine 1334. In such embodiments, it may be that the entirety of that analysis is performed within a single container 1336 as that single executable routine 1334 is executed therein. However, it may be that such a single executable routine 1334, when executed, is at least intended to cause the instantiation of multiple instances of itself that are intended to be executed at least partially in parallel. This may result in the execution of multiple instances of such an executable routine 1334 within a single container 1336 and/or across multiple containers 1336.

Alternatively or additionally, it may be that the logic of a requested analysis is implemented with multiple differing executable routines 1334. In such embodiments, it may be that at least a subset of such differing executable routines 1334 are executed within a single container 1336. However, it may be that the execution of at least a subset of such differing executable routines 1334 is distributed across multiple containers 1336.

Where an executable routine 1334 of an analysis is under development, and/or is under scrutiny to confirm its functionality, it may be that the container 1336 within which that executable routine 1334 is to be executed is additionally configured assist in limiting and/or monitoring aspects of the functionality of that executable routine 1334. More specifically, the execution environment provided by such a container 1336 may be configured to enforce limitations on accesses that are allowed to be made to memory and/or I/O addresses to control what storage locations and/or I/O devices may be accessible to that executable routine 1334. Such limitations may be derived based on comments within the programming code of the executable routine 1334 and/or other information that describes what functionality the executable routine 1334 is expected to have, including what memory and/or I/O accesses are expected to be made when the executable routine 1334 is executed. Then, when the executable routine 1334 is executed within such a container 1336, the accesses that are attempted to be made by the executable routine 1334 may be monitored to identify any behavior that deviates from what is expected.

Where the possibility exists that different executable routines 1334 may be written in different programming languages, it may be that different subsets of containers 1336 are configured to support different programming languages. In such embodiments, it may be that each executable routine 1334 is analyzed to identify what programming language it is written in, and then what container 1336 is assigned to support the execution of that executable routine 1334 may be at least partially based on the identified programming language. Where the possibility exists that a single requested analysis may be based on the execution of multiple executable routines 1334 that may each be written in a different programming language, it may be that at least a subset of the containers 1336 are configured to support the performance of various data structure and/or data format conversion operations to enable a data object output by one executable routine 1334 written in one programming language to be accepted as an input to another executable routine 1334 written in another programming language.

As depicted, at least a subset of the containers 1336 may be instantiated within one or more VMs 1331 that may be instantiated within one or more node devices 1330. Thus, in some embodiments, it may be that the processing, storage and/or other resources of at least one node device 1330 may be partially allocated through the instantiation of one or more VMs 1331, and then in turn, may be further allocated within at least one VM 1331 through the instantiation of one or more containers 1336.

In some embodiments, it may be that such a nested allocation of resources may be carried out to effect an allocation of resources based on two differing criteria. By way of example, it may be that the instantiation of VMs 1331 is used to allocate the resources of a node device 1330 to multiple users or groups of users in accordance with any of a variety of service agreements by which amounts of processing, storage and/or other resources are paid for each such user or group of users. Then, within each VM 1331 or set of VMs 1331 that is allocated to a particular user or group of users, containers 1336 may be allocated to distribute the resources allocated to each VM 1331 among various analyses that are requested to be performed by that particular user or group of users.

As depicted, where the processing system 1300 includes more than one node device 1330, the processing system 1300 may also include at least one control device 1350 within which one or more control routines 1354 may be executed to control various aspects of the use of the node device(s) 1330 to perform requested analyses. By way of example, it may be that at least one control routine 1354 implements logic to control the allocation of the processing, storage and/or other resources of each node device 1330 to each VM 1331 and/or container 1336 that is instantiated therein. Thus, it may be the control device(s) 1350 that effects a nested allocation of resources, such as the aforementioned example allocation of resources based on two differing criteria.

As also depicted, the processing system 1300 may also include one or more distinct requesting devices 1370 from which requests to perform analyses may be received by the control device(s) 1350. Thus, and by way of example, it may be that at least one control routine 1354 implements logic to monitor for the receipt of requests from authorized users and/or groups of users for various analyses to be performed using the processing, storage and/or other resources of the node device(s) 1330 of the processing system 1300. The control device(s) 1350 may receive indications of the availability of resources, the status of the performances of analyses that are already underway, and/or still other status information from the node device(s) 1330 in response to polling, at a recurring interval of time, and/or in response to the occurrence of various preselected events. More specifically, the control device(s) 1350 may receive indications of status for each container 1336, each VM 1331 and/or each node device 1330. At least one control routine 1354 may implement logic that may use such information to select container(s) 1336, VM(s) 1331 and/or node device(s) 1330 that are to be used in the execution of the executable routine(s) 1334 associated with each requested analysis.

As further depicted, in some embodiments, the one or more control routines 1354 may be executed within one or more containers 1356 and/or within one or more VMs 1351 that may be instantiated within the one or more control devices 1350. It may be that multiple instances of one or more varieties of control routine 1354 may be executed within separate containers 1356, within separate VMs 1351 and/or within separate control devices 1350 to better enable parallelized control over parallel performances of requested analyses, to provide improved redundancy against failures for such control functions, and/or to separate differing ones of the control routines 1354 that perform different functions. By way of example, it may be that multiple instances of a first variety of control routine 1354 that communicate with the requesting device(s) 1370 are executed in a first set of containers 1356 instantiated within a first VM 1351, while multiple instances of a second variety of control routine 1354 that control the allocation of resources of the node device(s) 1330 are executed in a second set of containers 1356 instantiated within a second VM 1351. It may be that the control of the allocation of resources for performing requested analyses may include deriving an order of performance of portions of each requested analysis based on such factors as data dependencies thereamong, as well as allocating the use of containers 1336 in a manner that effectuates such a derived order of performance.

Where multiple instances of control routine 1354 are used to control the allocation of resources for performing requested analyses, such as the assignment of individual ones of the containers 1336 to be used in executing executable routines 1334 of each of multiple requested analyses, it may be that each requested analysis is assigned to be controlled by just one of the instances of control routine 1354. This may be done as part of treating each requested analysis as one or more "ACID transactions" that each have the four properties of atomicity, consistency, isolation and durability such that a single instance of control routine 1354 is given full control over the entirety of each such transaction to better ensure that all of each such transaction is either entirely performed or is entirely not performed. Allowing partial performances to occur may cause cache incoherencies and/or data corruption issues.

As additionally depicted, the control device(s) 1350 may communicate with the requesting device(s) 1370 and with the node device(s) 1330 through portions of a network 1399 extending thereamong. Again, such a network as the depicted network 1399 may be based on any of a variety of wired and/or wireless technologies, and may employ any of a variety of protocols by which commands, status, data and/or still other varieties of information may be exchanged. It may be that one or more instances of a control routine 1354 cause the instantiation and maintenance of a web portal or other variety of portal that is based on any of a variety of communication protocols, etc. (e.g., a restful API). Through such a portal, requests for the performance of various analyses may be received from requesting device(s) 1370, and/or the results of such requested analyses may be provided thereto. Alternatively or additionally, it may be that one or more instances of a control routine 1354 cause the instantiation of and maintenance of a message passing interface and/or message queues. Through such an interface and/or queues, individual containers 1336 may each be assigned to execute at least one executable routine 1334 associated with a requested analysis to cause the performance of at least a portion of that analysis.

Although not specifically depicted, it may be that at least one control routine 1354 may include logic to implement a form of management of the containers 1336 based on the Kubernetes container management platform promulgated by Could Native Computing Foundation of San Francisco, Calif., USA. In such embodiments, containers 1336 in which executable routines 1334 of requested analyses may be instantiated within "pods" (not specifically shown) in which other containers may also be instantiated for the execution of other supporting routines. Such supporting routines may cooperate with control routine(s) 1354 to implement a communications protocol with the control device(s) 1350 via the network 1399 (e.g., a message passing interface, one or more message queues, etc.). Alternatively or additionally, such supporting routines may serve to provide access to one or more storage repositories (not specifically shown) in which at least data objects may be stored for use in performing the requested analyses.

Figure 14:
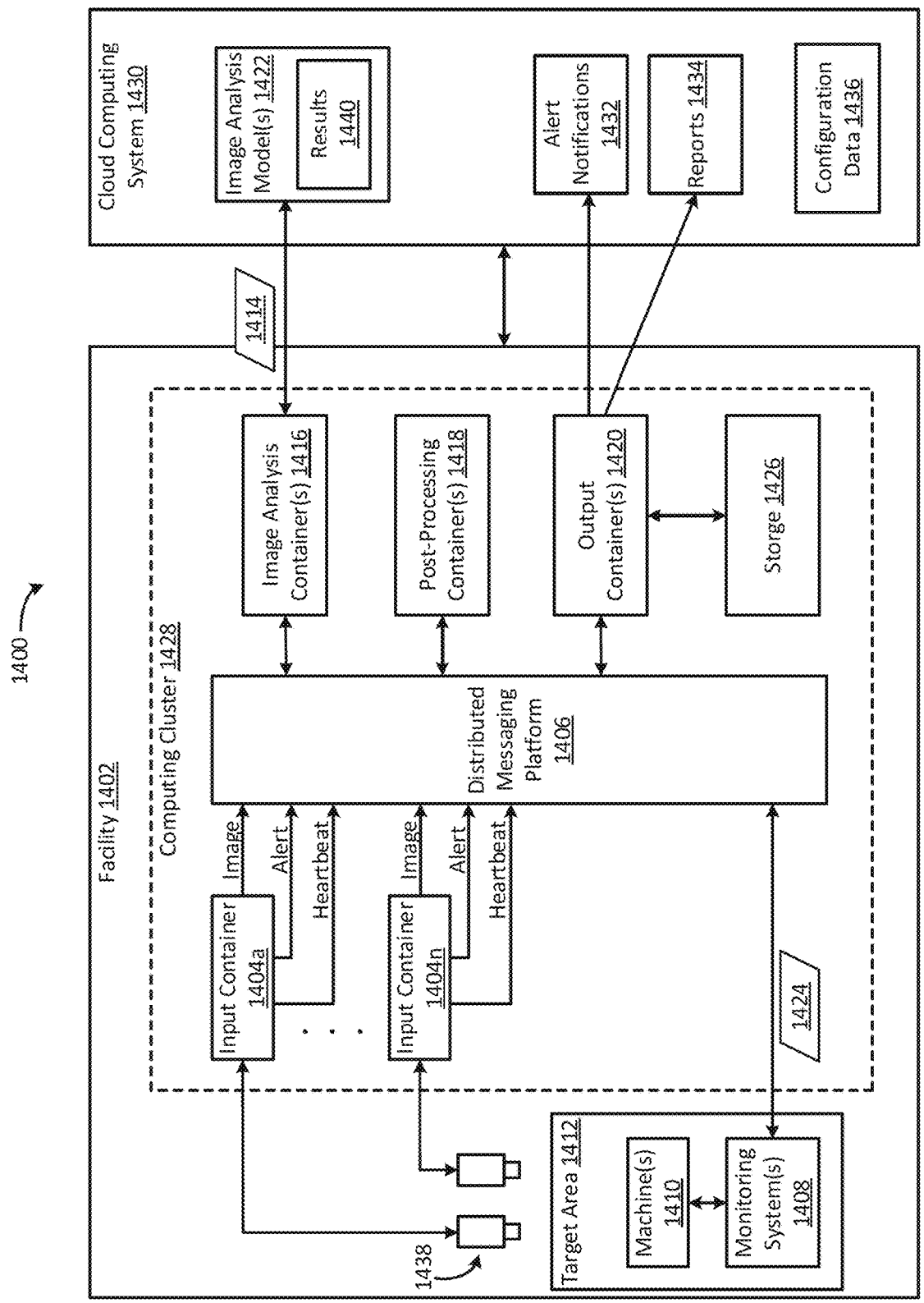
FIG. 14 shows a block diagram of an example of a system for performing digital image analysis according to some aspects of the present disclosure.

FIG. 14 shows a block diagram of an example of a system 1400 for performing digital image analysis according to some aspects of the present disclosure. The system 1400 includes a computer architecture that may generally have two parts—a computing cluster 1428 and a cloud computing system 1430. The computing cluster 1428 may (or may not) be located on-premises at a facility 1402. The cloud computing system 1430 can be separate from the computing cluster 1428 and may be located remotely from the facility 1402. For example, the cloud computer system 1430 may be provided by a cloud service provider, such as Amazon Web Services®, that is remote from the facility 1402. The computing cluster 1428 can be in communication with the cloud computer system 1430 via one or more networks, such as the Internet.

The facility 1402 can include one or more cameras 1438 configured to capture images and transmit them to the computing cluster 1428. The cameras 1438 can have wired or wireless interfaces for use in transmitting the images to the computing cluster 1428 via a network, such as a local area network at the facility 1402. The cameras 1438 can be configured to capture images of one or more target areas 1412. In some examples, the target areas 1412 can be associated with the one or more machines 1410 located at the facility 1402. For example, the facility 1402 can include six cameras 1438 positioned at different locations within the facility 1402 and oriented at different angles to capture a large spatial area surrounding the machines 1410. Examples of the machines 1410 can include robots, heaters, injection molders or other types of molders, rollers, or other types of physical equipment. In some examples, the cameras 1438 can be used in conjunction with the computing architecture to perform an automated detection operation, for example to detect whether an object (e.g., a human or animal) has entered a restricted zone like the target area 1412.

The computing cluster 1428 can include a container orchestration platform, which can assist with deploying and scaling containers. One example of the container orchestration platform can be Kubernetes®. The container orchestration platform can help manage containers and container pods ("pods") in the computing cluster 1428, which may reduce the workload on users, provide fault tolerance, and optimize usage of computing resources. A container pod can be a higher-level abstraction of one or more containers that may share resources and that may be co-located on the same host machine.

The container orchestration platform can be used to deploy input containers 1404*a-n* in the computing cluster 1428. The input containers 1404*a-n* can be configured to receive the images from the cameras 1438. Each of the input containers 1404*a-n* may correspond to a single camera and can be configured for receiving images from that camera. For example, input container 1404*a* can correspond to one of the cameras 1438 and input container 1404*b* can correspond to another of the cameras 1438. Depending on the number of cameras 1438 in the system 1400, the number of corresponding input containers 1404*a-n* can be scaled up or down accordingly. The container orchestration platform can simplify the process of scaling the number of input containers 1404*a-n* for a given number of cameras 1438. In some examples, some or all of the input containers 1404*a-n* can be deployed in container pods within the computing cluster 1428. Each of the input containers 1404*a-n* can be deployed in its own container pod or in a container pod that includes one or more other input containers. The input containers 1404*a-n* can receive respective sets of images from the cameras 1438 and transmit them in messages to a distributed messaging platform 1406, which may be internal or external to the computing cluster 1428.

The distributed messaging platform 1406 can include multiple nodes. The nodes can be physical servers or virtual servers, such as virtual machines. At least some of the nodes can be configured to operate as message brokers (e.g., event brokers). The message brokers can be configured to receive messages from producers and provide them to consumers. In the context of FIG. 1, the producers can be the input containers 1404*a-n* and the consumers can be other types of containers, such as the image analysis containers 1416 described later on. In some examples, a container may serve as both a producer and a consumer.

One example of the distributed messaging platform 1406 can include Apache Kafka®, though other examples may use other types of distributed messaging platforms. Apache Kafka® is an open-source distributed event store and stream-processing platform. In Apache Kafka®, the messages can indicate events. In the context of the present disclosure, the messages can indicate the images to be stored in the distributed messaging platform 1406.

Figure 15:
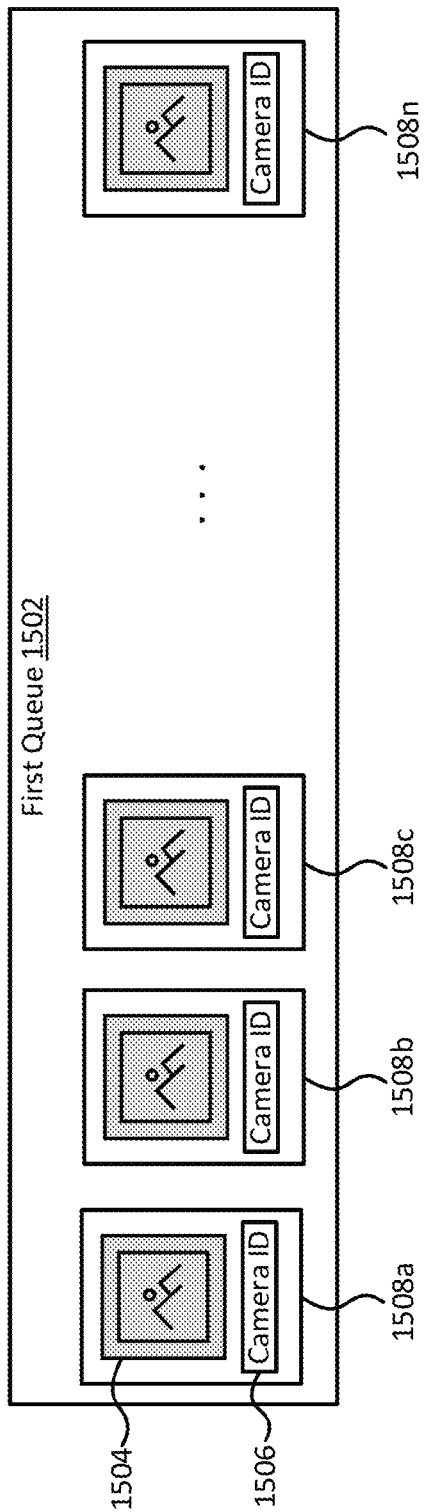
FIG. 15 shows a block diagram of an example of a first queue of a distributed messaging platform according to some aspects of the present disclosure.

In some examples, the distributed messaging platform 1406 can receive the messages from the input containers 1404*a-n* and store the corresponding images in a first queue. One example of this is shown in FIG. 15. As shown, each entry 1508*a-n* in the first queue 1502 can include an image 1504 and other information, such as a unique identifier 1506 of a camera that captured the image. Images can be stored in the first queue 1502 in the order in which they are received by the distributed messaging platform 1406. Thus, the first queue 1502 can include multiple images received from multiple cameras stored in the sequential order of their arrival. The distributed messaging platform 1406 can also receive alerts and store them in an alert queue (e.g., a queue for storing alerts), receive heartbeat information and store it in a heartbeat queue (e.g., a queue for storing heartbeat information), and/or receive other data from one or more other sources and store it in one or more other queues. The heartbeat information can relate to heartbeat signals that are periodically transmitted by a device to indicate the normal or abnormal operation of the device. These other queues are described in greater detail below.

In some examples, the input containers 1404*a-n* can also perform other functions. For example, the input containers 1404*a-n* can detect operational problems associated with the corresponding cameras 1438. In particular, each of the input containers 1404*a-n* can detect if a corresponding camera breaks, goes offline or becomes nonresponsive, or experiences another problem. This may be achieved by polling or otherwise attempting to communicate with the cameras 1438 periodically. In response to detecting such a problem, the input containers 1404*a-n* can transmit alerts to the distributed messaging platform 1406 indicating the problem. The distributed messaging platform 1406 can store those alerts in the alert queue and/or forward them to a recipient, such as a system administrator who can analyze the problem and try to resolve it. As another example, the input containers 1404*a-n* can periodically transmit heartbeat information to the distributed messaging platform 1406. The distributed messaging platform 1406 can store the heartbeat information in the heartbeat queue. If an input container 1404*a-n* breaks, goes offline or becomes nonresponsive, or experiences another problem, its ability to transmit the heartbeat information may become inhibited. The computing cluster 1428 (e.g., the container orchestration platform) can detect such problems and automatically perform one or more operations in an attempt to mitigate the problem. For example, the computing cluster 1428 can store one or more alerts in the alert queue for transmission to a recipient, such as a system administrator who can analyze the problem and try to resolve it. Additionally or alternatively, the computing cluster 1428 can use the container orchestration platform to attempt to automatically deploy a replacement input container and/or shutdown the broken input container in an effort to resolve the problem.

One or more image analysis containers 1416 can also be deployed in the computing cluster 1428, for example using the container orchestration platform. Some or all of the image analysis containers 1416 can be deployed within container pods in the computing cluster 1428. Each of the image analysis containers 1416 can be deployed in its own container pod or in a container pod that includes one or more other image-analysis containers. Any number of image analysis containers 1416 can be deployed and executed in parallel within the computing cluster 1428. The number of image analysis containers 1416 can be dynamically adjusted as needed, for example depending on the number of cameras 1438 and available computing resources. For instance, the computing cluster 1428 (e.g., the container orchestration platform) can scale up the number of image analysis containers 1416 if the number of images or cameras 1438 increases, and can scale down the number of image analysis containers 1416 if the number of images or cameras 1438 decreases. In some examples, the computing cluster 1428 may automatically adjust the number of image analysis containers 1416 based on one or more factors, such as the speed and size of the image analysis models, the frames-per-second of the cameras 1438, and the number of input containers 1404*a-n* (which can be used as a proxy for how many cameras are included in the system 1400).

The computing duster 1428 can also provide fault tolerance with respect the image analysis containers 1416. For example, the image analysis containers 1416 may provide heartbeat information, similar to the input containers 1404a-n. The computing cluster 1428 can detect a problem with an image analysis container 1416 (e.g., based on the heartbeat information or a lack thereof) and automatically perform one or more operations in an attempt to mitigate the problem. For example, the computing cluster 1428 can store one or more alerts in the alert queue for transmission to a recipient, such as a system administrator who can analyze the problem and try to resolve it. Additionally or alternatively, the computing duster 1428 can automatically deploy a replacement image-analysis container and/or shutdown the broken image-analysis container in an effort to resolve the problem.

The image analysis containers 1416 can receive images from the distributed messaging platform 1406. For example, the image analysis containers 1416 can retrieve the images from the first queue. The image analysis containers 1416 may retrieve the images from the first queue in response to detecting their presence in the first queue, for example by using a polling technique. Each of the image analysis containers 1416 may be responsible for handling images received from a particular input container or set of input containers, which can correspond to a particular camera or set of cameras. For example, an image analysis container 1416 may only request to receive images associated with a particular camera identifier or set of camera identifiers from the first queue, so that the image analysis container 1416 only handles images from that camera or cameras.

After receiving one or more images from the first queue, each of the image analysis containers 1416 can apply one or more image analysis models 1422 to their respective images to obtain image analysis results 1440. The image analysis containers 1416 can apply the same image-analysis models as one another or different image-analysis models from one another. One example of such an image analysis model 1422 can be the You Only Look Once (YOLO model), which can be an object detection model. In some examples, the image analysis containers 1416 can apply the image analysis models 1422 to their respective images by executing the models 1422 themselves. Additionally or alternatively, the image analysis containers 1416 can apply the image analysis models 1422 to their respective images by interfacing with a remote system that can execute the models 1422 in relation to the images. For example, the image analysis containers 1416 can transmit commands 1414 to the cloud computing system 1430, which is separate from the computing cluster 1428. In response to receiving the commands 1414, the cloud computing system 1430 can apply one or more image analysis models 1422 to the images to generate image analysis results 1440. The cloud computing system 1430 can then transmit the image analysis results 1440 to the image analysis containers 1416. Locating one or more image analysis models outside the computing cluster 1428, for example in a remote cloud computing environment 1430, can make it easier to manage and adjust the models 1422 as desired.

The image analysis results 1440 can indicate any suitable information. For example, the image analysis models 1422 may perform object detection and the image analysis results 1440 may indicate whether an object is present in a monitored zone, such as the target area 1412 associated with the one or more machines 1410. As another example, the image analysis results 1440 can indicate one or more locations of one or more objects in one or more of the images. For instance, the image analysis results 1440 can indicate that a particular object is present in an upper right quadrant of one or more of the images. As yet another example, the image analysis results 1440 can identify one or more objects in one or more of the images. For instance, the image analysis models 1422 may perform facial recognition, and the image analysis results 1440 may identify a particular person shown in one or more of the images. As still another example, the image analysis results 1440 can indicate one or more types or classifications of one or more objects in one or more of the images. For instance, the image analysis models 1422 may perform this classification on an object in an image, and the image analysis results 1440 may indicate that the object is or contains a human (or something else, such as an animal or a piece of equipment).

After obtaining the image analysis results 1440 (e.g., by generating them or receiving them from the cloud computing system 1430), the image analysis containers 1416 can transmit the image analysis results 1440 to the distributed messaging platform 1406. The distributed messaging platform 1406 can receive the image analysis results 1440 and store them in a second queue. The second queue can be distinct from the first queue. Additionally or alternatively, the image analysis containers 1416 can perform one or more other operations based on the image analysis results 1440. For example, the image analysis containers 1416 can generate one or more alerts based on the image analysis results 1440. The image analysis containers 1416 can then transmit the alerts to the distributed messaging platform 1406 for storage in the alert queue. For instance, if the image analysis results 1440 indicate that an object was detect in a monitored zone such as the target area 1412, the image analysis containers 1416 can generate a corresponding alert and transmit the alert to the distributed messaging platform 1406 for storage in the alert queue.

One or more post-processing containers 1418 can also be deployed in the computing cluster 1428, for example using the container orchestration platform. Some or all of the post-processing containers 1418 can be deployed within container pods in the computing duster 1428. Each of the post-processing containers 1418 can be deployed in its own container pod or in a container pod that includes one or more other post-processing containers. Any number of post-processing containers 1418 can be deployed and executed in parallel within the computing cluster 1428. The number of post-processing containers 1418 can be dynamically adjusted as needed, for example depending on the types of post-processing to be performed and the available computing resources. For instance, the computing cluster 1428 (e.g., the container orchestration platform) can scale up the number of post-processing containers 1418 if the number of images to be post-processed increases, and can scale down the number of image analysis containers 1416 if the number of images to be post-processed decreases. In some examples, the computing cluster 1428 may automatically adjust the number of post-processing containers 1418 based on the number of input containers 1404a-n, which can be used as a proxy for how many cameras are included in the system 1400 and/or how many images may require post-processing.

The computing duster 1428 can also provide fault tolerance with respect the post-processing containers 1418. For example, the post-processing containers 1418 may provide heartbeat information, similar to the input containers 1404a-n. The heartbeat information can include signals indicating the normal or abnormal operation of the post-processing containers 1418. The computing cluster 1428 can detect a problem with a post-processing container 1418 (e.g., based on the heartbeat information or a lack thereof) and automatically perform one or more operations in an attempt to mitigate the problem. For example, the computing cluster

1428 can store one or more alerts in the alert queue for transmission to a recipient, such as a system administrator who can analyze the problem and try to resolve it. Additionally or alternatively, the computing cluster 1428 can automatically deploy a replacement post-processing container and/or shutdown the broken post-processing container in an effort to resolve the problem.

The post-processing containers 1418 can receive images from the first queue, image analysis results 1440 from the second queue, or both. For example, the post-processing containers 1418 can retrieve the images from the first queue and the image analysis results from the second queue. The post-processing containers 1418 may retrieve the images from the first queue and the image analysis results 1440 from the second queue in response to detecting their presence, for example by using a polling technique. The post-processing containers 1418 can then perform post-processing operations based on the images, the image analysis results, or both to generate post-processing results.

The post-processing containers 1418 can perform any suitable post-processing operations to generate the post-processing results. The post-processing containers 1418 can execute the same post-processing operations as one another or different post-processing operations from one another. One example of a post-processing operation can involve anonymizing or otherwise obfuscating a portion of an image. For instance, the post-processing container 1418 can determine that an image includes sensitive information (e.g., PII). The post-processing container 1418 may make this determination itself by executing one or more image analysis models on the image. Alternatively, the post-processing container 1418 may make this determination based on the image analysis results 1440 previously received from the image analysis models 1422, for example if the image analysis results 1440 indicate that certain pixels contain sensitive information. The post-processing container 1418 can then delete or otherwise modify the content of those pixels to obfuscate the sensitive information. In some such examples, the post-processing results can include the modified images. Another example of the post-processing operations can involve reformatting the image analysis results 1440 from a first format to a second format. This may make the image analysis results 1440 more suitable for or compatible with a user or a piece of software. In some such examples, the post-processing results can include the reformatted image-analysis results 1440. Other examples of post-processing operations can include geofencing operations, cropping operations, object-tracking operations, image transformations, and mathematical computations (e.g., to map image distances to true world distances). After generating the post-processing results, the post-processing containers 1418 can transmit the post-processing results to the distributed messaging platform 1406, which can store the post-processing results in a third queue. The third queue can be distinct from the first queue and the second queue.

The computing cluster 1428 may also include one or more output containers 1420, which may be deployed using the container orchestration platform. Some or all of the output containers 1420 can be deployed within container pods in the computing cluster 1428. Each of the output containers 1420 can be deployed in its own container pod or in a container pod that includes one or more other output containers. Any number of output containers 1420 can be deployed and executed in parallel within the computing cluster 1428. The number of output containers 1420 can be dynamically adjusted as needed, for example depending on the number and types of outputs to be supplied, the number of recipients that are to receive the outputs, or the available computing resources. For instance, the computing duster 1428 (e.g., the container orchestration platform) can scale up the number of output containers 1420 if the number of output recipients increases, and can scale down the number of output containers 1420 if the number of output recipients decreases.

The computing cluster 1428 can also provide fault tolerance with respect the output containers 1420. For example, the output containers 1420 may provide heartbeat information, similar to the input containers 1404*a-n*. The computing duster 1428 can detect a problem with an output container 1420 (e.g., based on the heartbeat information or lack thereof) and automatically perform one or more operations in an attempt to mitigate the problem. For example, the computing cluster 1428 can store one or more alerts in the alert queue for transmission to a recipient, such as a system administrator who can analyze the problem and try to resolve it. Additionally or alternatively, the computing cluster 1428 can automatically deploy a replacement output containers and/or shutdown the broken output containers in an effort to resolve the problem.

The output containers 1420 can receive the images from the first queue, the image analysis results 1440 from the second queue, the post-processing results from the third queue, or any combination of these. For example, the output containers 1420 can retrieve the image analysis results 1440 from the second queue and the post-processing results from the third queue. The output containers 1420 may retrieve the images, the image analysis results 1440, and/or the post-processing results in response to detecting their presence in the respective queues, for example by using a polling technique. The output containers 1420 can perform one or more output operations based on the images from the first queue, the image analysis results 1440 from the second queue, the post-processing results from the third queue, or any combination of these.

The output containers 1420 can perform any suitable output operations. The output containers 1420 may execute the same output operations as one another or different output operations from one another. One example of an output operation can involve storing the images, the image analysis results 1440, and/or the post-processing results in storage 1426. Storage 1426 can include a volatile storage device, a non-volatile storage device, or both of these. Examples of volatile storage devices can include random access memory (RAM) or cache memory. Examples of non-volatile storage devices can include hard disks or hard drives. In some examples, the storage 1426 can be private storage that is only accessible to the computing cluster 1428. Alternatively, the storage 1426 can be shared storage that is accessible to one or more systems that are external to the computing cluster 1428, such as the cloud computing system 1430.

Another example of the output operations can involve generating alert notifications 1432. The alert notifications 1432 may be generated based on alerts in the alert queue of the distributed messaging platform 140. Additionally or alternatively, the alert notifications 1432 may be generated based on heartbeat information in the heartbeat queue of the distributed messaging platform 1406. For example, the output containers 1420 can determine, based on a lack of an expected heartbeat message in the heartbeat queue, that an input container 1402*a* has become nonresponsive and generate a corresponding alert notification 1432. The output containers 1420 can then transmit the alert notification 1432 to one or more recipients or cause the alert notification 1432 to be transmitted to the one or more recipients. One example of such a recipient can include the cloud computing system 1430, which may be configured to automatically perform one or more computing operations in response to receiving an alert notification 1432. In some examples, the recipients may customizable based on configuration data, such as configuration data 1436. In the configuration data, different types of alerts may be designated for different recipients or groups of recipients. The output containers 1420 can therefore generate an alert notification 1432, access the configuration data to determine one or more recipients for the alert notification 1432, and then transmit the alert notification 1432 to those recipients.

Yet another example of the output operations can involve generating reports 1434 based on the image analysis results 1440, the post-processing results, or both. A report 1434 can include a collection of information associated with the images and potentially gathered over a predesignated time period. For example, the reports 1434 can specify how many times objects were detected in the target area 1412 over a predesignated time period, such as one day. After generating a report 1434, the output containers 1420 can transmit the report 1434 to one or more recipients, such as the cloud computing system 1430, which may be configured to automatically perform one or more computing operations in response to receiving a report 1434. In some examples, the recipients can be customizable based on configuration data, such as configuration data 1436. In the configuration data, different types of reports may be designated for different recipients or groups of recipients. The output containers 1420 can therefore generate a report 1434, access the configuration data to determine one or more recipients for the report 1434, and then transmit the report 1434 to those recipients.

In some examples, the machines 1410 at the facility 1402 can have corresponding monitoring systems 1408. A monitoring system 1408 may be physically attached to a machine 1410 or may be separate from the machine 1410. Each monitoring system 1408 can be configured to monitor one or more characteristics of a corresponding machine 1410 and transmit messages 1424 indicating the one or more characteristics to the computing cluster 1428. To perform this monitoring, each monitoring system 1408 can include one or more sensors. Examples of the sensors can include temperature sensors, fluid flow sensors, power sensors, electrical current sensors, chemical sensors, optical sensors, pressure sensors, position sensors (e.g., inclinometers or GPS units), velocity sensors, acceleration sensors, flow rate sensors, or cameras. Examples of characteristics that may be sensed include force, torque, load, strain, position, temperature, air pressure, fluid flow, chemical properties, resistance, electromagnetic fields, radiation, irradiance, proximity, acoustics, moisture, distance, speed, vibrations, acceleration, electrical potential, and electrical current, among others. In some examples, the one or more characteristics monitored by a monitoring system 1408 can include an operational status (e.g., state) of the corresponding machine 1410, such as whether the machine 1410 is turned on, turned off, in an idle state, in an active state, or in an error state. The monitoring system 1408 can monitor operation of the machine 1410 to determine its operational status and transmit a message 1424 to the computing duster 1428 indicating the operational status of the machine 1410. Such a message 1424 may be referred to herein as a status message.

The computing duster 1428 may receive the messages 1424 (e.g., status messages) at the distributed messaging platform 1406, which can store the messages 1424 in a fourth queue. The fourth queue can be distinct from the first, second, and third queues. Various containers in the computing cluster 1428 may then receive the messages 1424 from the distributed messaging platform 1406 and perform one or more operations, or disable one or more operations, based on the one or more characteristics described in the messages 1424.

For example, the image analysis containers 1416 can receive the messages 1424 from the distributed messaging platform 1406 and determine the operational status of the machine 1410 based on the messages 1424. Because there may not be a safety concern if the machine 1410 is turned off or idle, there may be no need to perform object detection using the image analysis model 1422 when the machine 1410 is in those states. Therefore, if the image analysis containers 1416 determine that the machine 1410 is turned off or idle, the image analysis containers 1416 may forego applying the image analysis model 1422. Disabling usage of the image analysis model 1422 can conserve computing resources. On the other hand, if the image analysis containers 1416 determine that the machine 1410 is turned on or in an active state, the image analysis containers 1416 may allow the image analysis model 1422 to be applied.

Similar processes can be applied by the post-processing containers 1418 and the output containers 1420, for example to prevent the unnecessary consumption of computing resources. For instance, the output containers 1420 can receive messages 1424 from the distributed messaging platform 1406 and determine the operational status of the machine 1410 based on the messages 1424. Because there may not be a safety concern if the machine 1410 is turned off or idle, there may be no need to transmit corresponding alert notifications 1432 when the machine 1410 is in those states. Therefore, if the output containers 1420 determine that the machine 1410 is turned off or idle, the output containers 1420 may forego transmitting corresponding alert notifications 1432 to some or all recipients. Disabling the alert notifications can conserve computing resources. On the other hand, if the output containers 1420 determine that the machine 1410 is turned on or in an active state, the output containers 1420 may enable the transmission of alert notifications 1432.

Various aspects of the system 1400 can be designed to be flexible and customizable using configuration data 1436. The configuration data 1436 may be stored in the computing cluster 1428, the cloud computing system 1430, or both of these. The configuration data 1436 may specify, for example, how many input containers 1404*a-n* to deploy in the computing cluster 1428, how many image analysis containers 1416 to deploy in the computing cluster 1428, how many post-processing containers 1418 to deploy in the computing cluster 1428, how many output containers 1420 to deploy in the computing cluster 1428, which image analysis models 1422 are to be used (e.g., if there are multiple model options available), how to handle alert notifications 1432 and reports 1434 generated by the computing cluster 1428, or any combination of these. A user may be able to manually set these parameters and easily adjust them by updating the configuration data 1436, which may be stored in one or more files. To apply the settings in the configuration data 1436, the computing cluster (e.g., the container orchestration platform) can ingest the configuration data 1436 and automatically deploy the correct number of input containers 1404*a-n*, image analysis containers 1416, post-processing containers 1418, and/or output containers 1420. Similarly, the cloud computing system 1430 can ingest the configuration data 1436 and automatically apply the correct image-analysis model 1422, for example by routing requests from the image analysis containers 1416 to a running service executing the selected image-analysis model 1422. The cloud computing system 1430 may further ingest the configuration data 1436 and perform the operations specified therein based on the received alert notifications 1432 and reports 1434.

In some examples, the configuration data 1436 can including geofence data defining the boundaries of a geofenced region in which object detection is to be performed. For example, the configuration data 1436 can specify the spatial coordinates (e.g., latitude and longitude coordinates) of a set of points defining a boundary of a geofenced region for which object detection is to be enabled. The computing cluster 1428 may ingest the geofence data and use it in the object detection process. For example, the image analysis containers 1416 may receive image analysis results 1422 indicating that an object was detected in the images, determine that a location of the object falls within the geofenced region, and generate a corresponding alert (e.g., for storage in the alert queue of the distributed messaging platform 1406). As another example, the image analysis containers 1416 may receive image analysis results 1422 indicating that an object was detected in the images, determine that a location of the object falls outside the geofenced region, and prevent the output of a corresponding alert. The image analysis containers 1416 may prevent the output of the corresponding alert by not generating the alert in the first place or by interacting with the output containers 1420 to prevent the transmission of the alert.

It will be appreciated that the number and arrangement of components in FIG. 14 is intended to be illustrative and non-limiting. Other examples may involve more components, fewer components, different components, or a different arrangement of components than is shown in FIG. 14. For instance, the computing cluster 1428 can be remote from the facility 1402 in other examples. As one such example, the cloud computing system 1430 can include the computing cluster 1428, and the combination thereof may be remote from the facility 1402.

Figure 16:
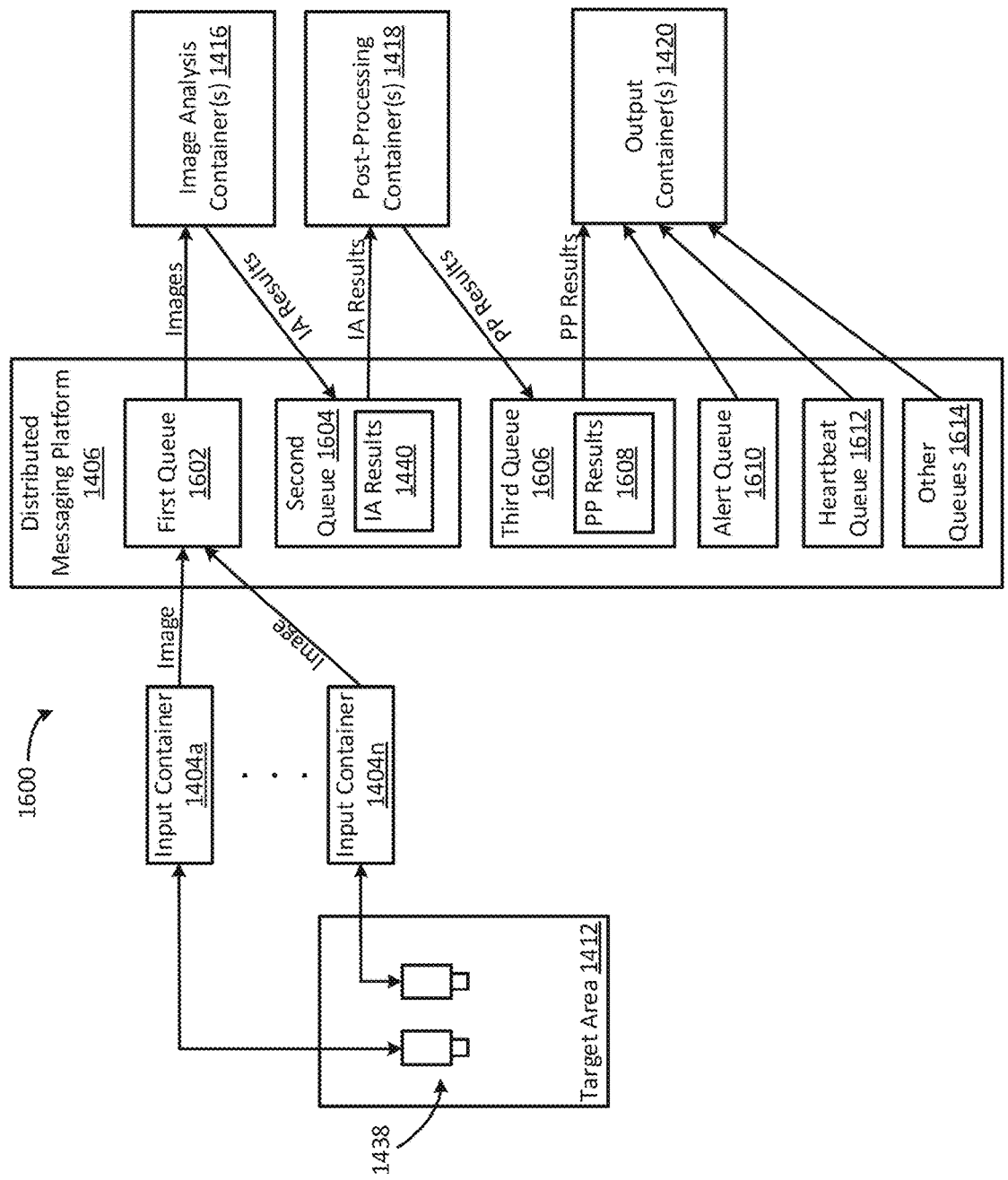
FIG. 16 shows a block diagram of an example of a system that includes a distributed messaging platform with multiple queues according to some aspects of the present disclosure.

FIG. 16 shows a block diagram of an example of a system 1600 that includes a distributed messaging platform 1406 with multiple queues according to some aspects of the present disclosure. The system 1600 can include cameras 1438 configured to capture images of a target area 1412, which is a physical area that may or may not include one or more machines. The cameras 1438 can transmit their respective images to input containers 1404*a-n*. The input containers 1404*a-n* may then transmit the raw images from the cameras 1438 to the distributed messaging platform 1406. Additionally or alternatively, the input containers 1404*a-n* may perform one or more image-processing operations on the raw images to create pre-processed images. Examples of the image-processing operations can include warping, filtering, scaling, enhancing, cropping, correcting illumination in, or editing the images. The image-processing operations can be implemented using image-processing algorithms that are different from the image analysis models 1422 described above. The input containers 1404*a-n* can then transmit the pre-processed images to the distributed messaging platform 1406. It will be appreciated that the term "images" used herein can refer to the raw images and/or the pre-processed images. Therefore, "images" can include either or both types of images.

The distributed messaging platform 1406 can receive the images and store them in a first queue 1602. The distributed messaging platform 1406 may then provide the images from the first queue 1602 to one or more image analysis containers 1416, for example upon request by the image analysis containers 1416. The image analysis containers 1416 can apply one or more image analysis models to the images to obtain image analysis results 1440 ("IA results"). The image analysis containers 1416 can then transmit the image analysis results 1440 to the distributed messaging platform 1406.

The distributed messaging platform 1406 can receive the image analysis results 1440 and store them in a second queue 1604, which is separate from the first queue 1602. The distributed messaging platform 1406 may then provide the image analysis results 1440 from the second queue 1604 to one or more post-processing containers 1418, for example upon request by the post-processing containers 1418. The post-processing containers 1418 can execute one or more post-processing operations with respect to the image analysis results 1440 to obtain post-processing results 1608 ("PP results"). The post-processing containers 1418 can then transmit the post-processing results to the distributed messaging platform 1406.

The distributed messaging platform 1406 can receive the post-processing results 1608 and store them in a third queue 1606, which is separate from the first queue 1602 and the second queue 1604. The distributed messaging platform 1406 may then provide the images from the first queue 1602, the image analysis results 1440 from the second queue 1604, and/or the post-processing results 1608 from the third queue 1606 to one or more output containers 1420, for example upon request by the output containers 1420. The output containers 1420 can execute one or more output operations based on the images, the image analysis results, and/or the post-processing results 1608. For example, the output containers 1420 can transmit alert notifications to one or more recipients (e.g., users or computer systems) based on the image analysis results and/or the post-processing results 1608.

In some examples, the distributed messaging platform 1406 may have additional queues. For example, the distributed messaging platform 1406 may include an alert queue 1610 as described above, a heartbeat queue 1612 as described above, and/or other queues 1614. The output containers 1420 can execute one or more output operations based on the content of the alert queue 1610, the heartbeat queue 1612, and/or the other queues 1614. For example, the output containers 1420 can obtain alerts from the alert queue 1610 and transmit corresponding alert notifications to one or more recipients.

It will be appreciated that the number and arrangement of components in FIG. 16 is intended to be illustrative and non-limiting. Other examples may involve more components, fewer components, different components, or a different arrangement of components than is shown in FIG. 16. For instance, there may be more queues or fewer queues in the distributed messaging platform 1406 in other examples.

Figure 17:
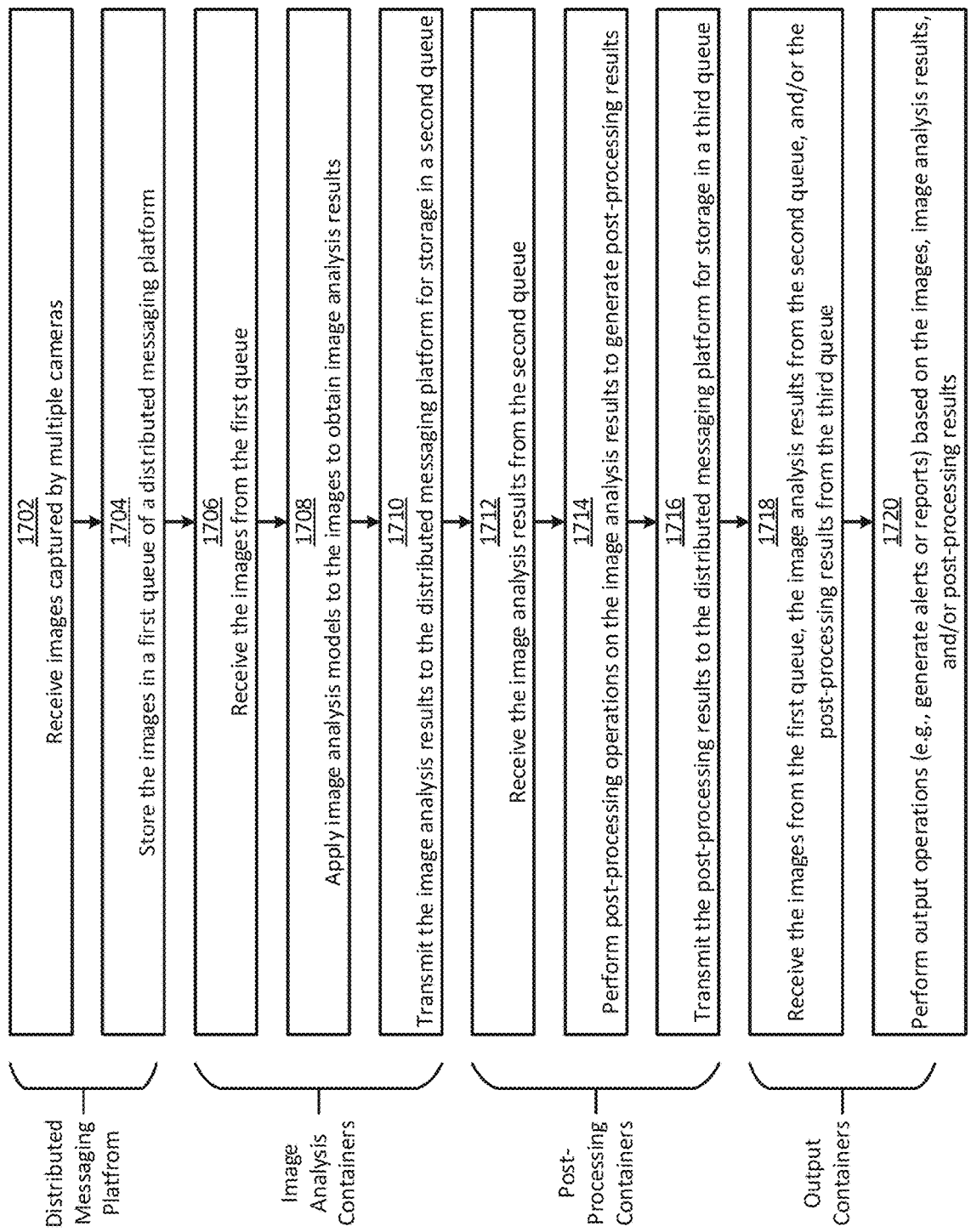
FIG. 17 shows a flowchart of an example of a process implemented by a computer architecture according to some aspects of the present disclosure.

FIG. 17 shows a flowchart of an example of a process implemented by a computer architecture according to some aspects of the present disclosure. Other examples may include more operations, fewer operations, different operations, or a different order of operations than is shown in FIG. 17. The operations of FIG. 17 are described below with reference to the components of FIGS. 14-16 described above.

In block 1702, a distributed messaging platform 1406 receives images captured by one or more cameras 1438. For example, the distributed messaging platform 1406 can receive the images from the cameras 1438. This may involve the distributed messaging platform 1406 receiving the images from the input containers 1404a-n, which in turn can receive the images from the cameras 1438.

In block 1704, the distributed messaging platform 1406 stores the images in a first queue 1602. The first queue 1602 may be a FIFO queue such that the images are positioned in the queue in the order in which they are received.

In block 1706, an image analysis container 1416 receives the images from the first queue 1602. For example, the image analysis container 1416 can transmit requests for the images to the distributed messaging platform 1406. In response to the requests, the distributed messaging platform 1406 can retrieve the images from the first queue 1602 and provide them to the image analysis container 1416.

In block 1708, the image analysis container 1416 applies one or more image analysis models 1422 to the images to obtain image analysis results 1440. For example, the image analysis container 1416 can execute the one or more image analysis models 1422 with respect to the images to generate the image analysis results 1440. As another example, the image analysis container 1416 can transmit commands 1414 to a cloud computing system 1430 for causing the cloud computing system 1430 to execute the one or more image analysis models 1422 and return the corresponding image analysis results 1440 to the image analysis containers 1416.

In block 1710, the image analysis container 1416 transmits the image analysis results 1440 to the distributed messaging platform 1406. The distributed messaging platform 1406 can receive the image analysis results 1440 and store them in a second queue 1604. The second queue 1604 may be a FIFO queue such that the image analysis results 1440 are positioned in the queue in the order in which they are received.

In block 1712, a post-processing container 1418 receives the image analysis results 1440 from the second queue 1604. For example, the post-processing container 1418 can transmit requests for the image analysis results 1440 to the distributed messaging platform 1406. In response to the requests, the distributed messaging platform 1406 can retrieve the image analysis results 1440 from the second queue 1604 and provide them to the post-processing container 1418.

In block 1714, the post-processing container 1418 performs one or more post-processing operations on the image analysis results 1440 to generate post-processing results 1608. Examples of the post-processing operations can include truncating, reformatting, or otherwise further processing the image analysis results 1440.

In block 1716, the post-processing container 1418 transmits the post-processing results 1608 to the distributed messaging platform 1406. The distributed messaging platform 1406 can receive the post-processing results 1608 and store them in a third queue 1606. The third queue 1606 may be a FIFO queue such that the post-processing results 1608 are positioned in the queue in the order in which they are received.

In block 1718, an output container 1420 receives the images from the first queue 1602, the image analysis results 1440 from the second queue 1604, and/or the post-processing results 1608 from the third queue 1606. For example, the output container 1420 can transmit requests for the post-processing results 1608 to the distributed messaging platform 1406. In response to the requests, the distributed messaging platform 1406 can retrieve the post-processing results 1608 from the third queue 1606 and provide them to the output container 1420.

In block 1720, the output container 1420 executes one or more output operations based on the images, the image analysis results 1440, and/or the post-processing results 1608. For example, the output container 1420 can generate an alert notification 1432 based on the image analysis results 1440, determine a recipient for the alert notification 1432 based on configuration data 1436, and then transmit the alert notification 1432 to the intended recipient. In some examples, the alert notification 1432 can include one or more of the images that correspond to the alert (e.g., the images that were analyzed to determine the image analysis results 1440 on which the alert is based). This may allow the recipient to, for example, view the objects that were detected in a monitored zone.

Figure 18:
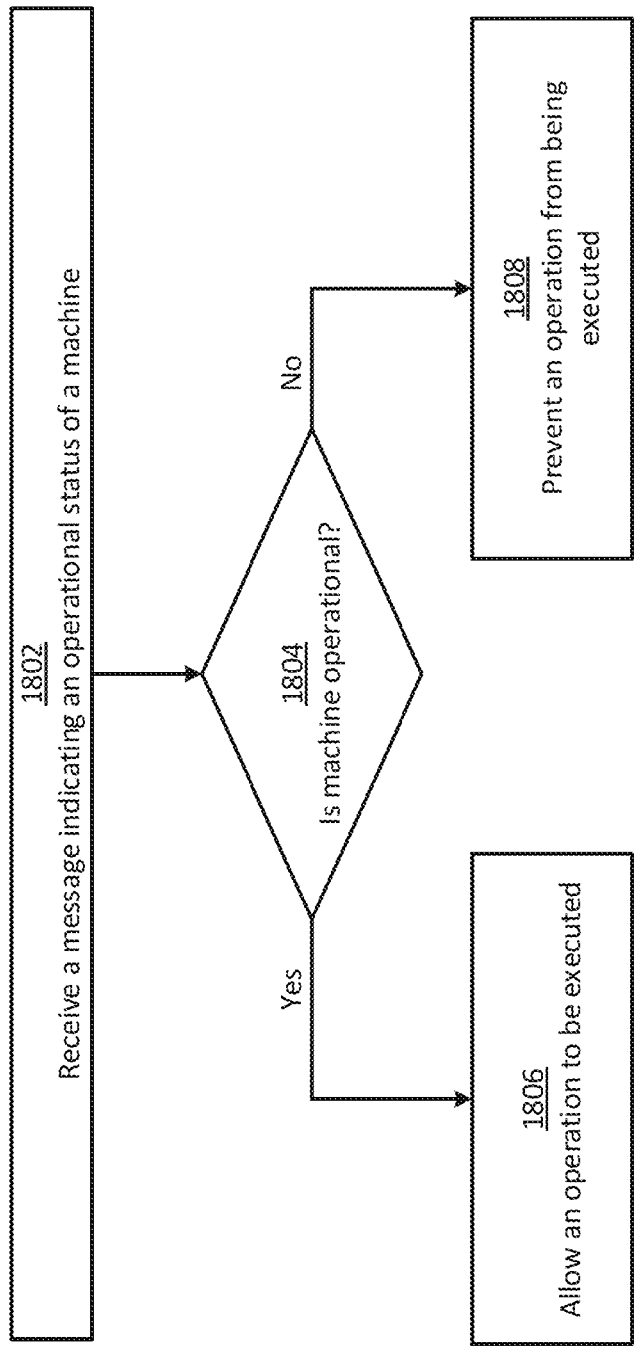
FIG. 18 shows a flowchart of an example of a process for enabling or disabling operations based on a machine's operational status according to some aspects of the present disclosure.

FIG. 18 shows a flowchart of an example of a process for enabling or disabling operations based on a machine's operational status according to some aspects of the present disclosure. Other examples may include more operations, fewer operations, different operations, or a different order of operations than is shown in FIG. 18. The operations of FIG. 18 are described below with reference to the components of FIGS. 14-16 described above.

In block 1802, a container receives a message 1424 indicating an operational status of a machine 1410. Examples of the container can include an image analysis container 1416, a post-processing container 1418, or an output container 1420. The container can receive the message 1424 from a distributed messaging platform 1406, which in turn may receive the message 1424 from a monitoring system 1408 associated with the machine 1410.

In block 1804, the container determines the operational status of the machine 1410 based on the message 1424. For example, the container can extract status information from the message 1424 and determine the operational status of the machine 1410 based on the status information. If the machine 1410 is operational (e.g., turned on or active), the process can proceed to block 1806. Otherwise, the process can proceed to block 1808.

In block 1806, the container allows an operation to be executed. For example, the container may be an image analysis container 1416 configured to allow the image analysis model 1422 to be applied to one or more images based on the machine 1410 being operational. As another example, the container may be an output container 1420 configured to allow an alert notification 1432 to be transmitted to a recipient based on the machine 1410 being operational.

In block 1808, the container prevents an operation to be executed. For example, the container may be an image analysis container 1416 configured to prevent the image analysis model 1422 from being applied to one or more images based on the machine 1410 being inactive (e.g., idle or turned off). As another example, the container may be an output container 1420 configured to prevent an alert notification 1432 from being transmitted to a recipient based on the machine 1410 being inactive.

Figure 19:
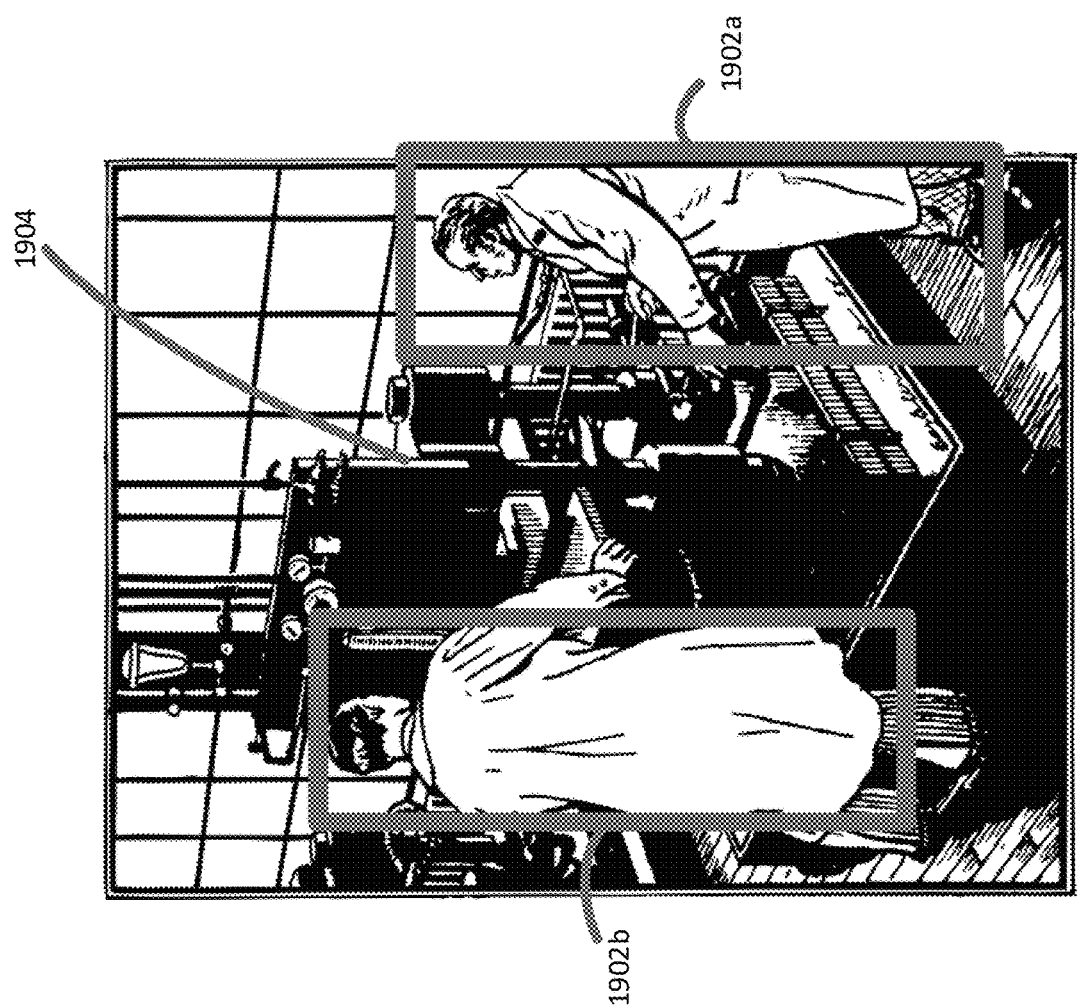
FIG. 19 shows an example of objects detected in a monitored zone of a manufacturing facility according to some aspects of the present disclosure.

FIG. 19 shows an example of objects 1902a-b detected in a monitored zone of a manufacturing facility according to some aspects of the present disclosure. The objects 1902a-b can be detected using the computer architecture described above. For example, the manufacturing facility can include one or more cameras oriented toward the target area shown in FIG. 19 for use in detecting objects in the target area. In this example, the objects to be detected are human workers or animals that enter the target area while a corresponding machine 1904 is operating.

The cameras can stream images of the target area in real time to the computing cluster described above. The images can be received at input containers of the computing cluster.

The input containers can transmit the images (e.g., in their raw or pre-processed form) to a distributed messaging platform of the computing cluster. The distributed messaging platform can then store the images in a first queue.

Image analysis containers of the computing cluster can then receive the images from the distributed messaging platform and apply an image analysis model to the images. In this example, the image analysis model is an object detection model. The object detection model can return a result indicating whether objects are present in the target area. In this example, the object detection model has returned a result indicating that two objects 1902*a-b* are present in the target area. The result can also indicate the locations of the two objects 1902*a-b* in a corresponding image. This result can then be further processed by a post-processing container of the computing cluster. The post-processing results can be stored in the distributed messaging platform.

In some examples, an alert notification or report can be generated by an output container of the computing cluster. The output container can generate the alert notification or report based on the results from the object detection model and/or the post-processing results. In this example, the alert notification can be configured to notify a supervisor or other entity of the detected objects 1902*a-b* in the target area.

In the previous description, for the purposes of explanation, specific details are set forth in order to provide a thorough understanding of examples of the technology. But various examples can be practiced without these specific details. The figures and description are not intended to be restrictive.

The previous description provides examples that are not intended to limit the scope, applicability, or configuration of the disclosure. Rather, the previous description of the examples provides those skilled in the art with an enabling description for implementing an example. Various changes may be made in the function and arrangement of elements without departing from the spirit and scope of the technology as set forth in the appended claims.

Specific details are given in the previous description to provide a thorough understanding of the examples. But the examples may be practiced without these specific details. For example, circuits, systems, networks, processes, and other components can be shown as components in block diagram form to prevent obscuring the examples in unnecessary detail. In other examples, well-known circuits, processes, algorithms, structures, and techniques may be shown without unnecessary detail in order to avoid obscuring the examples.

Also, individual examples may have been described as a process that is depicted as a flowchart, a flow diagram, a data flow diagram, a structure diagram, or a block diagram. Although a flowchart can describe the operations as a sequential process, many of the operations can be performed in parallel or concurrently. In addition, the order of the operations can be re-arranged. And a process can have more or fewer operations than are depicted in a figure. A process can correspond to a method, a function, a procedure, a subroutine, a subprogram, etc. When a process corresponds to a function, its termination can correspond to a return of the function to the calling function or the main function.

Systems depicted in some of the figures can be provided in various configurations. In some examples, the systems can be configured as a distributed system where one or more components of the system are distributed across one or more networks in a cloud computing system.

The invention claimed is:

1. A system comprising:
a plurality of processors; and
a plurality of memories including program code that is executable by the plurality of processors for causing the plurality of processors to:
    execute a distributed messaging platform configured to receive a plurality of images of a target area and store the plurality of images in a first queue, the plurality of images being captured by a plurality of cameras;
    execute a first container configured to:
        receive the plurality of images from the first queue;
        apply an image analysis model to the plurality of images to generate an image analysis result; and
        transmit the image analysis result to the distributed messaging platform, the distributed messaging platform being configured to receive the image analysis result and store the image analysis result in a second queue;
    execute a second container that is separate from the first container, the second container being configured to:
        receive the image analysis result from the second queue;
        perform a post-processing operation on the image analysis result to generate a post-processing result; and
        transmit the post-processing result to the distributed messaging platform, the distributed messaging platform being configured to receive the post-processing result and store the post-processing result in a third queue; and
    execute one or more output containers that are separate from the first container and the second container, the one or more output containers being configured to:
        receive the post-processing result from the third queue;
        generate an alert notification based on the post-processing result; and
        transmit the alert notification to one or more recipient devices.

2. The system of claim 1, further comprising a monitoring system associated with a machine positioned in the target area, the monitoring system being configured to monitor operation of the machine and transmit a status message indicating an operational status of the machine to the distributed messaging platform.

3. The system of claim 2, wherein the first container is further configured to:
receive the status message from the distributed messaging platform;
determine the operational status of the machine based on the status message; and
based on the operational status of the machine, forego applying the image analysis model to one or more images captured by the plurality of cameras.

4. The system of claim 2, wherein the one or more output containers are further configured to:
receive the status message from the distributed messaging platform;
determine the operational status of the machine based on the status message; and
based on the operational status of the machine, forego transmitting one or more alert notifications in relation to one or more images captured by the plurality of cameras.

5. The system of claim 1, wherein the image analysis model is an object detection model configured to detect whether an object is present in the target area, and wherein the alert notification is configured to indicate that the object is present in the target area.

6. The system of claim 1, wherein the plurality of memories further include program code that is executable by the plurality of processors for causing the plurality of processors to execute a plurality of input containers corresponding to the plurality of cameras, each input container of the plurality of input containers being configured to:
receive images from a respective camera of the plurality of cameras;
forward the images to the distributed messaging platform; and
provide heartbeat information indicating an operational status of the respective camera to the distributed messaging platform.

7. The system of claim 6, wherein the one or more input containers are further configured to:
detect a problem with a camera of the plurality of cameras; and
transmit an alert indicating the problem with the camera.

8. The system of claim 1, wherein the image analysis model is located in a cloud computing environment that is separate from the system, the first container being configured to remotely access the cloud computing environment to apply the image analysis model to the plurality of images.

9. The system of claim 1, wherein the distributed messaging platform is further configured to store each image of the plurality of images in the first queue with a corresponding identifier that uniquely identifies which camera of the plurality of cameras captured the image.

10. The system of claim 1, wherein the post-processing operation includes an image-redaction operation configured to remove or obfuscate at least a portion of an image for privacy purposes.

11. The system of claim 1, further comprising a configuration file that includes spatial coordinates defining a geofenced region that includes the target area, wherein the one or more output containers are configured to receive the configuration file and generate the alert notification in response to determining that an object is present in the geofenced region.

12. A method comprising:
executing, by a plurality of processors of a computing cluster, a distributed messaging platform configured to receive a plurality of images of a target area and store the plurality of images in a first queue, the plurality of images being captured by a plurality of cameras;
executing, by the plurality of processors, a first container configured to:
receive the plurality of images from the first queue;
apply an image analysis model to the plurality of images to generate an image analysis result; and
transmit the image analysis result to the distributed messaging platform, the distributed messaging platform being configured to receive the image analysis result and store the image analysis result in a second queue;
executing, by the plurality of processors, a second container that is separate from the first container, the second container being configured to:
receive the image analysis result from the second queue;
perform a post-processing operation on the image analysis result to generate a post-processing result; and
transmit the post-processing result to the distributed messaging platform, the distributed messaging platform being configured to receive the post-processing result and store the post-processing result in a third queue; and
executing, by the plurality of processors, one or more output containers that are separate from the first container and the second container, the one or more output containers being configured to:
receive the post-processing result from the third queue;
generate an alert notification based on the post-processing result; and
transmit the alert notification to one or more recipient devices.

13. The method of claim 12, further comprising:
monitoring, by a monitoring system, operation of a machine positioned in the target area; and
transmitting, by the monitoring system, a status message indicating an operational status of the machine to the distributed messaging platform.

14. The method of claim 13, wherein the first container is further configured to:
receive the status message from the distributed messaging platform;
determine the operational status of the machine based on the status message; and
based on the operational status of the machine, forego applying the image analysis model to one or more images captured by the plurality of cameras.

15. The method of claim 13, wherein the one or more output containers are further configured to:
receive the status message from the distributed messaging platform;
determine the operational status of the machine based on the status message; and
based on the operational status of the machine, forego transmitting one or more alert notifications in relation to one or more images captured by the plurality of cameras.

16. The method of claim 12, wherein the image analysis model is an object detection model configured to detect whether an object is present in the target area, and wherein the alert notification is configured to indicate that the object is present in the target area.

17. The method of claim 12, further comprising executing a plurality of input containers corresponding to the plurality of cameras, each input container of the plurality of input containers being configured to:
receive images from a respective camera of the plurality of cameras;
forward the images to the distributed messaging platform; and
provide heartbeat information indicating an operational status of the respective camera to the distributed messaging platform.

18. The method of claim 17, wherein the one or more input containers are further configured to:
detect a problem with a camera of the plurality of cameras; and
transmit an alert indicating the problem with the camera.

19. The method of claim 12, wherein the image analysis model is located in a cloud computing environment that is remote from the computing cluster, the first container being configured to remotely access the cloud computing environment to apply the image analysis model to the plurality of images.

20. The method of claim 12, wherein the distributed messaging platform is further configured to store each image of the plurality of images in the first queue with a corresponding identifier that uniquely identifies which camera of the plurality of cameras captured the image.

21. The method of claim 12, wherein the post-processing operation includes an image-redaction operation configured to remove or obfuscate at least a portion of an image for privacy purposes.

22. The method of claim 12, further comprising:
receiving, by the one or more output containers, a configuration file that includes spatial coordinates defining a geofenced region that includes the target area; and
generating, by the one or more output containers, the alert notification in response to determining that an object is present in the geofenced region.

23. A non-transitory computer-readable medium comprising program code that is executable by one or more processors for causing the one or more processors to:
execute a distributed messaging platform configured to receive a plurality of images of a target area and store the plurality of images in a first queue, the plurality of images being captured by a plurality of cameras;
execute a first container configured to:
receive the plurality of images from the first queue;
apply an image analysis model to the plurality of images to generate an image analysis result; and
transmit the image analysis result to the distributed messaging platform, the distributed messaging platform being configured to receive the image analysis result and store the image analysis result in a second queue;
execute a second container that is separate from the first container, the second container being configured to:
receive the image analysis result from the second queue;
perform a post-processing operation on the image analysis result to generate a post-processing result; and
transmit the post-processing result to the distributed messaging platform, the distributed messaging platform being configured to receive the post-processing result and store the post-processing result in a third queue; and
execute one or more output containers that are separate from the first container and the second container, the one or more output containers being configured to:
receive the post-processing result from the third queue;
generate an alert notification based on the post-processing result; and
transmit the alert notification to one or more recipient devices.

24. The non-transitory computer-readable medium of claim 23, wherein a monitoring system is associated with a machine positioned in the target area, the monitoring system being configured to monitor operation of the machine and transmit a status message indicating an operational status of the machine to the distributed messaging platform.

25. The non-transitory computer-readable medium of claim 24, wherein the first container is further configured to:
receive the status message from the distributed messaging platform;
determine the operational status of the machine based on the status message; and
based on the operational status of the machine, forego applying the image analysis model to one or more images captured by the plurality of cameras.

26. The non-transitory computer-readable medium of claim 24, wherein the one or more output containers are further configured to:
receive the status message from the distributed messaging platform;
determine the operational status of the machine based on the status message; and
based on the operational status of the machine, forego transmitting one or more alert notifications in relation to one or more images captured by the plurality of cameras.

27. The non-transitory computer-readable medium of claim 24, further comprising program code that is executable by the one or more processors for causing the one or more processors to execute a plurality of input containers corresponding to the plurality of cameras, each input container of the plurality of input containers being configured to:
receive images from a respective camera of the plurality of cameras;
forward the images to the distributed messaging platform; and
provide heartbeat information indicating an operational status of the respective camera to the distributed messaging platform.

28. The non-transitory computer-readable medium of claim 27, wherein the one or more input containers are further configured to:
detect a problem with a camera of the plurality of cameras; and
transmit an alert indicating the problem with the camera.

29. The non-transitory computer-readable medium of claim 24, wherein the image analysis model is located in a cloud computing environment that is remote from the one or more processors, the first container being configured to remotely access the cloud computing environment to apply the image analysis model to the plurality of images.

30. The non-transitory computer-readable medium of claim 23, wherein the image analysis model is an object detection model configured to detect whether an object is present in the target area, and wherein the alert notification is configured to indicate that the object is present in the target area.

* * * * *